US012720357B2

(12) United States Patent
Li et al.

(10) Patent No.: US 12,720,357 B2
(45) Date of Patent: Aug. 25, 2026

(54) USER EQUIPMENT, ELECTRONIC DEVICE, WIRELESS COMMUNICATION METHOD, AND STORAGE MEDIUM

(71) Applicant: Sony Group Corporation, Tokyo (JP)

(72) Inventors: Lantao Li, Beijing (CN); Chen Sun, Beijing (CN)

(73) Assignee: Sony Group Corporation, Tokyo (JP)

( * ) Notice: Subject to any disclaimer, the term of this patent is extended or adjusted under 35 U.S.C. 154(b) by 404 days.

(21) Appl. No.: 18/546,984

(22) PCT Filed: Jun. 24, 2021

(86) PCT No.: PCT/CN2021/101976

§ 371 (c)(1),
(2) Date: Aug. 18, 2023

(87) PCT Pub. No.: WO2022/183636

PCT Pub. Date: Sep. 9, 2022

(65) Prior Publication Data

US 2024/0137798 A1 Apr. 25, 2024
US 2024/0236752 A9 Jul. 11, 2024

(30) Foreign Application Priority Data

Mar. 2, 2021 (CN) ......................... 202110229092.0

(51) Int. Cl.
*H04W 28/02* (2009.01)

(52) U.S. Cl.
CPC ... *H04W 28/0215* (2013.01); *H04W 28/0268* (2013.01)

(58) Field of Classification Search
None
See application file for complete search history.

(56) References Cited

U.S. PATENT DOCUMENTS

2015/0030037 A1* 1/2015 Ahn .................. H04W 56/0005 370/503
2017/0230815 A1* 8/2017 Yasukawa ............ H04W 72/02
(Continued)

FOREIGN PATENT DOCUMENTS

CN 109005527 A 12/2018
CN 109314841 A 2/2019
(Continued)

OTHER PUBLICATIONS

ZTE, "Discussion on QoS management for NR V2X", 3GPP TSG-RAN WG2 #103bis, R2-1814175, Oct. 8-12, 2018, pp. 1-4.
(Continued)

*Primary Examiner* — Andre Tacdiran
(74) *Attorney, Agent, or Firm* — XSENSUS LLP

(57) ABSTRACT

User equipment includes a processing circuit, which is configured to: generate characteristics information of a QoS flow for D2D communication between the user equipment and other user equipments, wherein the characteristics information comprises periodicity information and transmission time information of a data service carried by the QoS flow; and transmitting the characteristics information to a network-side device, such that the network-side device allocates, to the user equipment and according to the characteristics information, resources for the D2D communication. By using the user equipment, the electronic device, the wireless communication method, and the computer-readable storage medium, a base station can allocate resources to a user equipment according to the characteristics of a QoS flow, thereby optimizing the process of a base station allocating resources to a user equipment.

9 Claims, 11 Drawing Sheets

(56) References Cited

U.S. PATENT DOCUMENTS

| | | | | |
|---|---|---|---|---|
| 2019/0223081 | A1* | 7/2019 | Cheng | H04W 48/06 |
| 2019/0350040 | A1* | 11/2019 | Liu | H04B 7/088 |
| 2019/0357076 | A1* | 11/2019 | Han | H04W 28/0268 |
| 2020/0305167 | A1* | 9/2020 | Freda | H04W 72/569 |
| 2021/0044956 | A1* | 2/2021 | Kim | H04L 1/1854 |
| 2021/0168646 | A1* | 6/2021 | Chen | H04W 28/10 |
| 2021/0219168 | A1* | 7/2021 | Liu | H04W 28/0205 |
| 2023/0047819 | A1* | 2/2023 | Ding | H04W 16/14 |
| 2023/0086421 | A1* | 3/2023 | Gan | H04W 28/12 370/328 |
| 2023/0156858 | A1* | 5/2023 | Freda | H04W 52/0219 370/329 |
| 2023/0189045 | A1* | 6/2023 | Chen | H04W 28/0252 370/252 |

FOREIGN PATENT DOCUMENTS

| | | | |
|---|---|---|---|
| CN | 109428836 | A | 3/2019 |
| CN | 109479302 | A | 3/2019 |
| CN | 109952806 | A | 6/2019 |
| CN | 110072258 | A | 7/2019 |
| CN | 110447260 | A | 11/2019 |
| CN | 111556567 | A | 8/2020 |
| CN | 111918401 | A | 11/2020 |
| WO | WO-2019195138 | A1 | 10/2019 |
| WO | 2020/051807 | A1 | 3/2020 |
| WO | 2020/068991 | A1 | 4/2020 |

OTHER PUBLICATIONS

International Search Report and Written Opinion mailed on Oct. 20, 2021, received for PCT Application PCT/CN2021/101976, filed on Jun. 24, 2021, 8 pages including English Translation.

Interdigital Inc: "On Uu-based Sidelink Resource Allocation and Configuration", 3GPP Draft; R1-1900801 On UU-Based Sidelink Resource Allocation and Configuration, 3rd Generation Partnership Project (3GPP), Mobile Competence Centre ; 650, Route Des Lucioles ; F-06921 Sophia-Antipo vol. RAN WG1, No. Taipei, Taiwan; Jan. 21, 2019-Jan. 25, 2019 Jan. 20, 2019 (Jan. 20, 2019), XP051593647.

Nokia et al: "On the discrepancy TX-centric vs. RX-centric in Sidelink DRX", 3GPP Draft; R2-2101209, 3rd Generation Partnership Project (3GPP), Mobile Competence Centre ; 650, Route Des Lucioles ; F-06921 Sophia-Antipolis Cedex ; France vol. RAN WG2, No. electronic; Jan. 25, 2021-Feb. 5, 2021 Jan. 14, 2021 (Jan. 14, 2021), XP051972850.

* cited by examiner

USER EQUIPMENT, ELECTRONIC DEVICE, WIRELESS COMMUNICATION METHOD, AND STORAGE MEDIUM

CROSS-REFERENCE TO RELATED APPLICATIONS

This application is based on PCT filing PCT/CN2021/101976, filed Jun. 24, 2021, which claims priority to Chinese Patent Application No. 202110229092.0, titled "USER EQUIPMENT, ELECTRONIC DEVICE, WIRELESS COMMUNICATION METHOD, AND STORAGE MEDIUM", filed on Mar. 2, 2021, with the China National Intellectual Property Administration, each of which is incorporated herein by reference in its entirety.

FIELD

Embodiments of the present disclosure generally relate to the field of wireless communication, and in particular to user equipment, electronic equipment, a wireless communication method, and a computer-readable storage medium. More particularly, the present disclosure relates to user equipment in a wireless communication system, electronic equipment serving as network side equipment in a wireless communication system, a wireless communication method executed by user equipment in a wireless communication system, a wireless communication method executed by network side equipment in a wireless communication system, and a computer-readable storage medium.

BACKGROUND

A structure of user equipment generally includes an access stratum (AS) layer, a non-access stratum (NAS) layer, and an application layer. The application layer transmits, to the NAS layer, to-be-transmitted data and an application layer (transmission) requirement corresponding to the to-be-transmitted data. The NAS layer matches the data according to an established quality of service (QoS) rule, that is, maps the data to a QoS flow, marks a corresponding QoS flow identifier on the data, and transmits the data to the AS layer. The AS layer maps, based on the QoS flow identifier, the QoS flow to radio bear (RB) of the AS layer, so as to transmit the QoS flow. In a case that the NAS layer fails to find a QoS rule corresponding to the data, the NAS layer initiates a process of establishing or modifying a QoS flow. In this process, a QoS flow identifier corresponding to the data is determined at the NAS layer, the QoS rule corresponding to the QoS flow identifier is established based on a service type of the data and an application layer (transmission) requirement corresponding to the to-be-transmitted data, and the established QoS flow is transferred to the AS layer. The AS layer determines the radio bearer corresponding to the QoS flow at the AS layer based on a QoS requirement corresponding to the QoS rule.

There are two ways to request for wireless resources at the AS layer of the user equipment. In mode 1, a base station allocates resources to the user equipment. In mode 2, the user equipment determines the resources by itself. In a case of the mode 1 for requesting wireless resources, the user equipment transmits a QoS parameter and a QoS rule to the base station, so that the base station is enabled to allocate resources to the user equipment based on characteristics of the QoS flow.

However, in a conventional QoS mechanism, the user equipment reports only parameter requirements such as latency and a packet loss rate, without considering the characteristics of a QoS flow. Therefore, the base station can obtain only a coarse-grained QoS requirement, and the resources allocated to the user equipment may not meet demands of the user equipment.

Therefore, it is necessary to propose a technical solution that enables the base station to allocate resources to user equipment based on characteristics of a QoS flow, so as to optimize a process of the base station allocating resources to the user equipment.

SUMMARY

This section provides a general summary of the present disclosure, rather than a comprehensive disclosure of a full scope or all features of the present disclosure.

An objective of the present disclosure is to provide user equipment, electronic equipment, a wireless communication method, and a computer readable storage medium, in order to enable a base station to allocate resources to the user equipment based on characteristics of a QoS flow, so as to optimize a process of the base station allocating resources to the user equipment.

According to an aspect of the present disclosure, user equipment is provided. The user equipment includes processing circuitry configured to: generate characteristic information of a QoS flow used for D2D communication between the user equipment and other user equipment, the characteristic information including periodicity information and transmission time information of a data service carried by the QoS flow; and transmit the characteristic information to network side equipment, for the network side equipment to allocate resources used for the D2D communication for the user equipment according to the characteristic information.

According to another aspect of the present disclosure, electronic equipment is provided. The electronic equipment includes processing circuitry configured to: receive, from user equipment, characteristic information of a QoS flow used for D2D communication between the user equipment and other user equipment, the characteristic information including periodicity information and transmission time information of a data service carried by the QoS flow; and allocate resources used for the D2D communication for the user equipment according to the characteristic information.

According to another aspect of the present disclosure, a wireless communication method executed by user equipment is provided. The method includes: generating characteristic information of a QoS flow used for D2D communication between the user equipment and other user equipment, the characteristic information including periodicity information and transmission time information of a data service carried by the QoS flow; and transmitting the characteristic information to network side equipment, for the network side equipment to allocate resources used for the D2D communication for the user equipment according to the characteristic information.

According to another aspect of the present disclosure, a wireless communication method executed by electronic equipment is provide. The method includes: receiving, from user equipment, characteristic information of a QoS flow used for D2D communication between the user equipment and other user equipment, the characteristic information including periodicity information and transmission time information of a data service carried by the QoS flow; and allocating resources used for the D2D communication for the user equipment according to the characteristic information.

According to another aspect of the present disclosure, a computer readable storage medium is provided. The computer readable storage medium includes executable computer instructions which, when executed by a computer, cause the computer to execute the wireless communication method according to the present disclosure.

According to another aspect of the present disclosure, a computer program is provided. The computer program, when executed by a computer, causes the computer to execute the wireless communication method according to the present disclosure.

With the user equipment, the electronic equipment, the wireless communication method, and the computer readable storage medium according to the present disclosure, the characteristic information of a QoS flow, including the periodicity information and the transmission time information of the data service can be transmitted from the user equipment to network side equipment, so that the network side equipment can allocate resources for the user equipment based on characteristics of the QoS flow. Thereby, a process of the network side equipment allocating resources to the user equipment is optimized.

Further areas of applicability will become apparent from the description provided herein. The description and specific examples in this summary are for purposes of illustration only and are not intended to limit the scope of the present disclosure.

BRIEF DESCRIPTION OF THE DRAWINGS

The drawings are described herein for illustrating selected embodiments, rather than all possible embodiments, and are not intended to limit the scope of the present disclosure. In the drawings:

FIG. 11(*a*) is a schematic diagram showing that network side equipment allocates resources to user equipment throughout a time domain in a case that a time domain width of a transmission time window is less than $T_{min}$ according to an embodiment of the present disclosure;

FIG. 11(*b*) is a schematic diagram showing that network side equipment allocates resources to user equipment throughout a time domain in a case that a time domain width of a transmission time window is greater than $T_{min}$ according to an embodiment of the present disclosure;

Figures 1, 2:
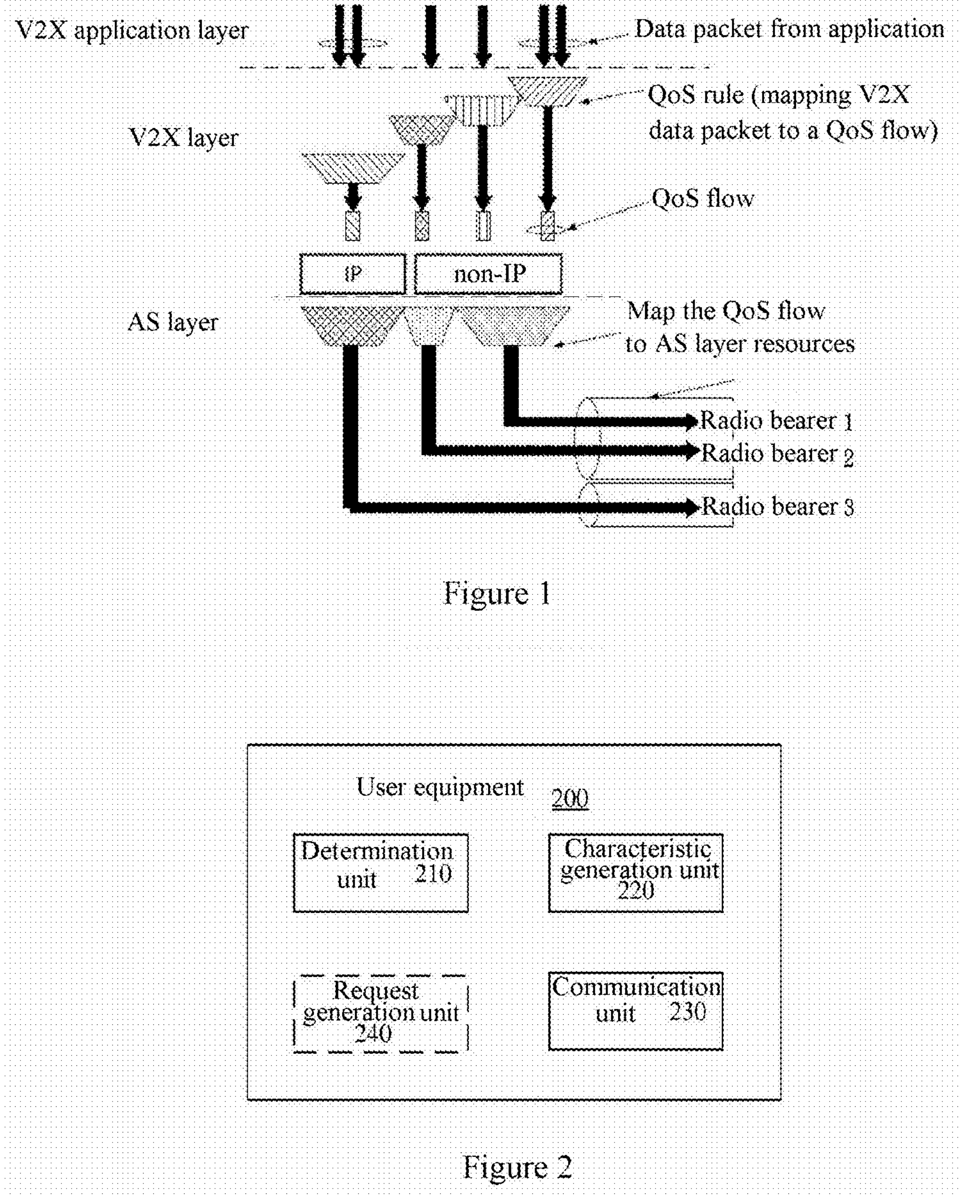
FIG. 1 is a schematic diagram showing a three-layer structure of user equipment according to an embodiment of the present disclosure.
FIG. 2 is a block diagram showing an example of a configuration of user equipment according to an embodiment of the present disclosure.

Although the present disclosure is susceptible to various modifications and alternatives, specific embodiments of the present disclosure are shown in the drawings by way of examples and are described in detail herein. However, it should be understood that description of the specific embodiments herein is not intended to limit the present disclosure to the specific forms disclosed, but to cover all modifications, equivalents and substitutions that fall within the spirit and scope of the present disclosure. It should be noted that same or similar reference numerals throughout the drawings indicate the same or like components.

DETAILED DESCRIPTION

The embodiments of the present disclosure are described completely with reference to the drawings. The following description is merely exemplary, and is not intended to limit the present disclosure and application or use thereof.

Exemplary embodiments are provided so that the present disclosure is thorough and fully conveys the scope thereof to those skilled in the art. Numerous specific details, such as examples of specific components, devices, and methods, are set forth to provide a comprehensive understanding of the embodiments of the present disclosure. It is apparent for those skilled in the art that the exemplary embodiments may be implemented in many different forms without specific details, and should not be construed as limiting the scope of the present disclosure. In some exemplary embodiments, well-known processes, well-known structures, and well-known technologies are not described in detail.

The description is made in the following order:

1. Description of scene;
2 Configuration examples of user equipment;
3 Configuration examples of network side equipment;
4. Method embodiments;
5. Application examples.

1. Description of Scene

FIG. 1 is a schematic diagram showing a three-layer structure of user equipment according to an embodiment of the present disclosure. The user equipment here refers to user equipment in an Internet of Vehicles. For the user equipment in the Internet of Vehicles, a structure of the user equipment includes three layers, i.e., an AS layer, a V2X (Vehicle to X) layer, and a V2X application layer. That is, a NAS layer is represented as the V2X layer, and an application layer is represented as the V2X application layer.

As shown in FIG. 1, the V2X application layer transmits, to the V2X layer, a data packet from respective applications and corresponding (transmission) QoS requirements. The V2X layer matches the data packet according to an established QoS rule, that is, maps the data packets to a QoS flow, marks a corresponding QoS flow identifier on the data, and transmits the data to the AS layer. The AS layer maps the QoS flow to resources of the AS layer, namely RB, and transmits the QoS flow. In a case that the NAS layer fails to find a QoS rule corresponding to the data, the NAS layer initiates a process of establishing or modifying a QoS flow. In this process, a QoS flow identifier corresponding to the data is determined at the NAS layer, the QoS rule corresponding to the QoS flow identifier is established based on a service type of the data and an application layer (transmission) requirement corresponding to the to-be-transmitted data, and the established QoS flow is transferred to the AS layer. The AS layer determines the radio bearer corresponding to the QoS flow at the AS layer based on a QoS requirement corresponding to the QoS rule.

As mentioned above, in the conventional QoS mechanism, the user equipment reports only parameter requirements such as latency and a packet loss rate, without considering the characteristics of a QoS flow. Therefore, a base station can obtain only a coarse-grained QoS requirement, and the resources allocated to the user equipment may not meet demands of the user equipment.

In view of the above scene, this disclosure proposes electronic equipment in a wireless communication system, a wireless communication method executed by the electronic equipment in the wireless communication system, and a computer-readable storage medium, with which a base station is enabled to allocate resources to user equipment based on characteristics of a QoS flow, so that a process of the base station allocating resources to the user equipment is optimized.

The disclosed wireless communication system according to the present disclosure may be a 5G NR (New Radio) communication system. In addition, the wireless communication system may include D2D (Device-to-Device) communication, V2X communication, and other scenes.

The network side equipment according to the present disclosure may be base station equipment, such as an eNB or gNB (a base station in the 5th-generation communication system).

The user equipment according to the present disclosure may be a mobile terminal (such as a smart phone, a tablet personal computer (PC), a laptop PC, a portable game terminal, wearable device such as a smart watch, a portable/dongle mobile router, and a digital camera device) or a vehicle terminal (such as a car navigation device). The user equipment may also be implemented as a terminal (also called a machine type communication (MTC) terminal) that performs machine to machine (M2M) communication. In addition, the user equipment may be a wireless communication module (such as an integrated circuit module including a single chip) installed on each of the above terminals. The user equipment in the present disclosure may be disposed as an independent device in the vehicle, or integrated into the vehicle.

Although the user equipment and the network side equipment are described in the present disclosure by way of examples in which a QoS flow carries a data service for D2D communication, the same applies to a case where the QoS flow carries a data service between the user equipment and the network side equipment.

2 Configuration Examples of User Equipment

FIG. 2 is a block diagram showing an example of a configuration of user equipment 200 according to an embodiment of the present disclosure.

As shown in FIG. 2, the user equipment 200 may include a determination unit 210, a characteristic generation unit 220, and a communication unit 230.

Here, each unit of the user equipment 200 may be included in processing circuitry. It should be noted that the user equipment 200 may include a single processing circuit or multiple processing circuits. Further, the processing circuitry may include various discrete functional units for performing different functions and/or operations. It should be noted that these functional units may be physical entities or logical entities, and units with different names may be implemented by a same physical entity.

According to an embodiment of the present disclosure, the determination unit 210 may determine characteristic information of a QoS flow used for D2D communication between the user equipment 200 and other user equipment. That is, the user equipment 200 may serves as a transmitting side equipment in the D2D communication, and the other user equipment may serve as a receiving side equipment in the D2D communication. In a case where the user equipment 200 requires the D2D communication with other user equipment, the determination unit 210 may determine the characteristic information of the QoS flow for the D2D communication.

According to an embodiment of the present disclosure, the determination unit 210 may determine periodicity information and transmission time information of a data service carried by the QoS flow. That is, the user equipment 200 needs to periodically perform the D2D communication with other user equipment. That is, the D2D communication between the user equipment 200 and other user equipment has a fixed period or frequency.

According to an embodiment of the present disclosure, the characteristic generation unit 220 may generate characteristic information to be transmitted to a network side, based on the periodicity information and the transmission time information of the data service carried by the QoS flow determined by the determination unit 210.

According to an embodiment of the present disclosure, the user equipment 200 may transmit, through the communication unit 230, the characteristic information generated by the characteristic generation unit 220 to network side equipment. In this way, the network side equipment can allocate resources used for D2D communication for the user equipment 200 according to the characteristic information. That is, the D2D communication of the user equipment 200 has a fixed period or frequency, and the network side equipment can allocate periodic resources to user equipment 200.

It can be seen that with the user equipment 200 according to the embodiments of the present disclosure, the characteristic information of the QoS flow, including the periodicity information and the transmission time information of the data service, is transmitted to the network side equipment, so that the network side equipment is enabled to allocate resources to the user equipment 200 based on characteristics of the QoS flow. Therefore, a process of the network side equipment allocating resources to the user equipment 200 is optimized.

According to an embodiment of the present disclosure, the periodicity information of the QoS flow may include a transmission period of the data service or a transmission frequency of the data service. For example, in a case where the data service for the D2D communication of the user equipment 200 has a fixed period T, the periodicity information of the QoS flow may include a transmission period T of the data service. In a case where the data service for the D2D communication of the user equipment 200 has a fixed frequency F, the periodicity information of the QoS flow may include a transmission frequency F of the data service. In the case of the transmission frequency F, the network side equipment may calculate a transmission period T of the data service as T=1/F.

Figures 3, 4, 5:
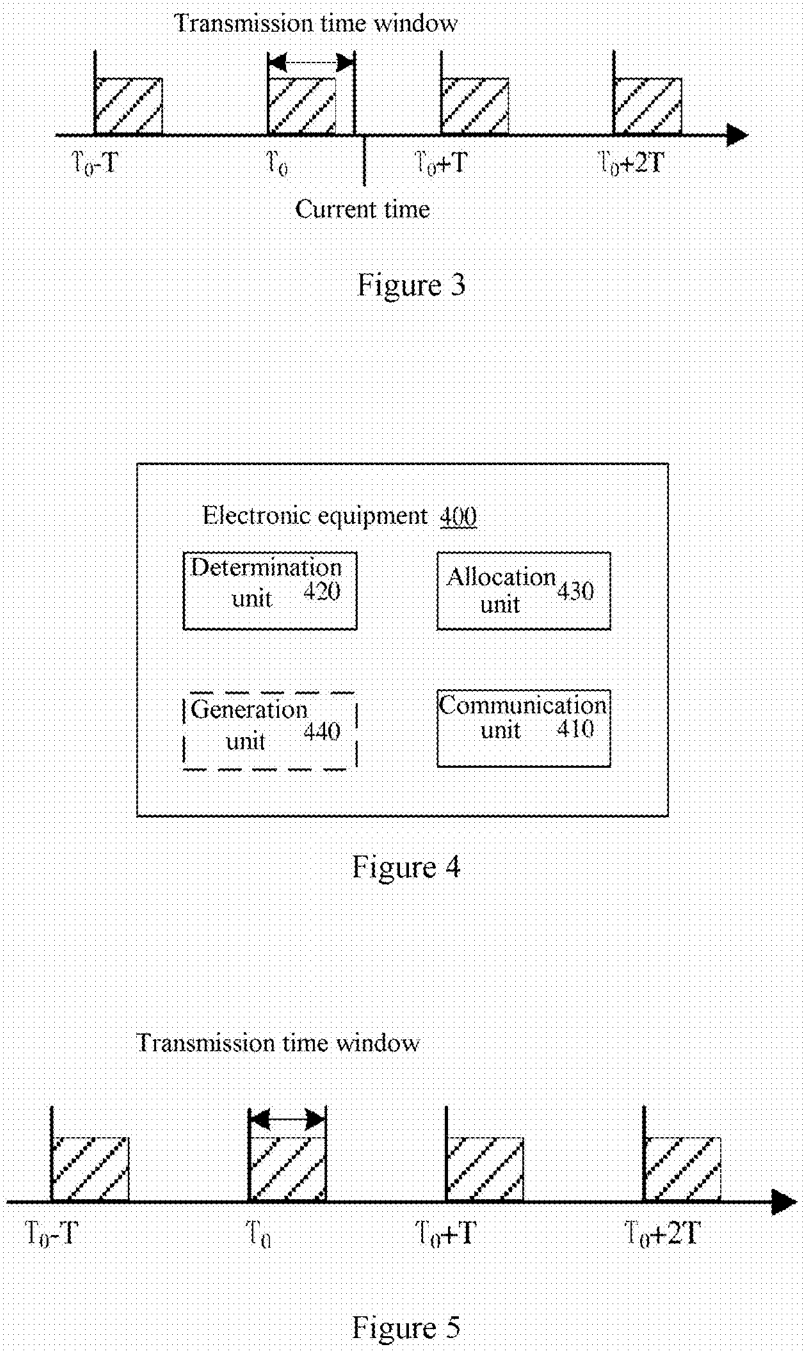
FIG. 3 is a schematic diagram showing resources periodically allocated by network side equipment to user equipment according to an embodiment of the present disclosure.
FIG. 4 is a block diagram showing an example of a configuration of electronic equipment serving as network side equipment according to an embodiment of the present disclosure.
FIG. 5 is a schematic diagram showing allocation of continuous time-domain resources within a transmission time window, in a case that a time domain width of the transmission time window is less than T, according to an embodiment of the present disclosure.

FIG. 3 is a schematic diagram showing resources periodically allocated by network side equipment to user equipment according to an embodiment of the present disclosure. In FIG. 3, a horizontal axis represents a time domain, and a shaded area represents resources periodically allocated by the network side equipment to the user equipment. A period of the allocated resources is T, which means a transmission period T of the data service of the user equipment 200, or a transmission period T calculated based on the transmission frequency F of the data service of the user equipment 200.

According to an embodiment of the present disclosure, the transmission time information of the QoS flow may include a transmission start time of data of the data service in any data transmission period. Here, the transmission start time may be later or earlier than a current time.

According to an embodiment of the present disclosure, the transmission time information of the QoS flow may include an absolute value of the transmission start time, such as an accurate coordinated universal time (UTC), or may include a relative value of the transmission start time, such as an offset between the transmission start time and the current time, or an offset with respect to a certain reference time.

As shown in FIG. 3, the user equipment 200 selects a time earlier than the current time (i.e. a transmission start time of data in a data transmission period immediately preceding the current time) as the transmission start time $T_0$. That is, the user equipment 200 wishes to start to transmit D2D data at a time instant $T_0$+nT (where n is an integer).

In this way, the network side equipment can allocate resources to the user equipment 200 periodically based on the periodicity information and the transmission time information transmitted from the user equipment 200.

According to an embodiment of the present disclosure, the determination unit 210 may determine data size information of the data service in one data transmission period. The characteristic information of the QoS flow generated by the characteristic generation unit 220 may further include the data size information. Here, sizes of D2D data transmitted periodically from the user equipment 200 are the same. In this way, the network side equipment can determine, based on the data size information, a size of resources allocated to the user equipment 200 in each data transmission period.

According to an embodiment of the present disclosure, the determination unit 210 may further determine whether the user equipment 200 supports an adjustment for the transmission time information. That is, in a case that the transmission start time of data from the user equipment 200 in a data transmission period can be adjusted to a time instant other than $T_0$+nT (where n is an integer), it is determined that the user equipment 200 supports an adjustment for the transmission time information; and in a case that the transmission start time of data from the user equipment 200 in a data transmission period has to be $T_0$+nT (where n is an integer) and cannot be adjusted to another time instant, it is determined that the user equipment 200 does not support an adjustment for the transmission time information.

Furthermore, the characteristic information of the QoS flow generated by the characteristic generation unit 220 may also include information indicating whether the user equipment 200 supports adjusting the transmission time information. In this way, the network side equipment can determine, based on the information, whether a transmission time can be adjusted in a case that the network side equipment cannot allocate resources periodically as the transmission time required by the user equipment 200.

As mentioned above, according to an embodiment of the present disclosure, the characteristic information of the QoS flow transmitted from the user equipment 200 to the network side equipment may include the periodicity information of the QoS flow and the transmission time information of the QoS flow. Alternatively, the characteristic information of QoS flows may further include: data size information of the data service in one data transmission period; and/or information representing whether user equipment 200 supports an adjustment for the transmission time information.

According to an embodiment of the present disclosure, the determination unit 210 may be disposed on the application layer of the user equipment 200. Specifically, in a case where the user equipment 200 is in a vehicle network, determination unit 210 may be disposed at a V2X application layer of the user equipment 200. That is, the characteristic information of the QoS flow is determined at the application layer of the user equipment 200 and transmitted to the NAS layer of the user equipment 200.

According to an embodiment of the present disclosure, the determining unit 210 in the application layer of the user equipment 200 may determine the characteristic information of the QoS flow based on a specific application (data transmission) requirement (such as a fixed frame rate video stream, a periodic driving status information during smooth driving, and the like), and transfer the characteristic information to the NAS layer. The characteristic information is then transferred to the AS layer for transmission.

According to an embodiment of the present disclosure, the determination unit 210 may be disposed on the NAS layer of the user equipment 200. Specifically, in a case where the user equipment 200 is in a vehicle network, the determination unit 210 may be disposed on a V2X layer of the user equipment 200. Here, the application layer of the user equipment 200 may generate indication information indicating that transmission of the data service has periodicity and transmit the indication information to the NAS layer. The determination unit 210 on the NAS layer may determine the characteristic information of the QoS flow based on historical data of the data service on the QoS flow.

For example, the determination unit 210 may determine a time interval between transmission start times of two adjacent data in a predetermined time period on the QoS flow, and take an average or median of the determined multiple time intervals as a transmission period of the QoS flow. For example, the determination unit 210 may take any transmission start time of data as a transmission start time of the QoS flow. For example, the determination unit 210 may determine a data size in each data transmission period within a predetermined time period on the QoS flow, and take a maximum, average, or median of the determined multiple data sizes as a data size in each data transmission period of the QoS flow. In this case, whether the user equipment 200 supports an adjustment for the transmission time information needs to be indicated by the application layer.

According to an embodiment of the present disclosure, the characteristic generation unit 220 may carry the characteristic information of the QoS flow through RRC signaling. Specifically, the characteristic generation unit 220 may carry the characteristic information of the QoS flow through a SidelinkUElnformationNR message in the RRC signaling. For example, the characteristic generation unit 220 carries, in a QoS profile, the characteristic information of the QoS flow.

According to an embodiment of the present disclosures, the QoS profile may further include the following QoS parameters: PQI (PC5 5G QoS Identifier), which can be mapped to some characteristics of PC5 5G QoS, including but not limited to a priority level, a packet delay budget (PDB), a packet error rate (PER); and/or GFBR/MFBR (Guaranteed Flow Bits Rate/Maximum Flow Bits Rate). That is, the network side equipment can determine the priority level, PDB, and PER based on a mapping relationship between the PQI and the priority, PDB, and PER.

According to an embodiment of the present disclosure, the user equipment 200 may transmit the characteristic information of the QoS flow carried by the SidelinkUEInformationNR message to the network side equipment, after receiving a system message from the network side equipment, where the system message is, for example, a SIB (system information block) 12 (where SIB12 is a system message dedicated to a side link) message.

According to an embodiment of the present disclosure, the user equipment 200 may receive, through the communication unit 230, resource information periodically allocated by the network side equipment to the user equipment 200, and thereby transmit D2D data to other user equipment based on the resource information periodically allocated by network side equipment.

According to an embodiment of the present disclosure, in a case that a fixed change occurs in the characteristic information of the QoS flow, the determination unit 210 may determine updated characteristic information of the QoS flow, and the characteristic generation unit 220 may regenerate the characteristic information of the QoS flow based on the updated characteristic information of the QoS flow. Hence, the user equipment 200 can transmit the updated characteristic information of the QoS flow to the network side equipment through the communication unit 230.

According to an embodiment of the present disclosure, the fixed change refers to a long-term and relatively stable change, that is, original characteristic information of the QoS flow is to be changed to the updated characteristic information of the updated QoS flow within a predetermined length of time in the future (where the predetermined length is greater than or equal to a predetermined time threshold). In other words, after the characteristic information of the QoS flow is changed, there is no longer any change within a certain period of time (the predetermined time threshold). In addition, according to an embodiment of the present disclosures, the fixed change in the characteristic information of the QoS flow may include a fixed change in one or more of the following information: the periodicity information of the QoS flow; the transmission time information of the QoS flow; the data size information of the data service in one data transmission period; and information representing whether the user equipment 200 supports an adjustment for the transmission time information. That is, in a case of a fixed change in any of the characteristic information of the QoS flow, the user equipment 200 may report only the updated characteristic information, or the user equipment 200 may report all characteristic information collectively.

According to an embodiment of the present disclosure, as shown in FIG. 2, the user equipment 200 may further include a request generation unit 240. The request generation unit 240 is for generating request information for requesting the network side equipment to allocate resources to the user equipment 200 throughout a time domain, in a case of a non-fixed change in the characteristic information of the QoS flow.

According to an embodiment of the present disclosures, the non-fixed change refers to a short-term and unstable change, that is, original characteristic information of the QoS flow is to be changed to the updated characteristic information of the QoS flow in a short period of time (which is less than the predetermined time threshold). After this short period of time, the characteristic information of the QoS flow recovers to the original characteristic information of the QoS flow, or becomes other characteristic information of the QoS flow.

According to an embodiment of the present disclosure, the request information generated by the request generation unit 240 may include a minimum transmission period or maximum transmission frequency of data carried by the QoS flow. For example, the user equipment 200 may estimate the minimum transmission period or maximum transmission frequency of data based on a type of data service or other parameters. Furthermore, the user equipment 200 may transmit, through communication unit 230, the request information generated by the request generation unit 240 to the network side equipment.

In response to the request information, the network side equipment may determine whether to allow resource allocation for the user equipment 200 throughout a time domain. In a case that the network side equipment allocates resources to the user equipment 200 throughout the time domain, there are available resources no matter when the user equipment 200 needs to transmit data. Furthermore, starting from any time instant, in a time period having a length of a PDB requirement corresponding to the data, resources available for the user equipment are greater than or equal to resources required for (one) transmission of the data. Such resource scheduling is known as “saturated resource scheduling”.

It can be seen that according to the embodiment of the present disclosure, the user equipment 200 can transmit the characteristic information of the QoS flow to the network side equipment, so that the network side equipment can periodically allocate resources to the user equipment 200 based on the characteristic information of the QoS flow. In this way, the resources allocated by the network side equipment can better satisfy a demand of the user equipment 200, and thereby a process of the network side equipment allocating resources to the user equipment 200 is optimized. In addition, According to an embodiment of the present disclosure, in a case that a fixed change occurs in the characteristic information of the QoS flow, the user equipment 200 may transmit updated characteristic information of the QoS flow to the network side equipment. Furthermore, in a case that a non-fixed change occurs in the characteristic information of the QoS flow, the user equipment 200 may apply for the saturated resource scheduling, in order to meet a demand for data transmission.

According to an embodiment of the present disclosure, the user equipment 200 may further determine, based on the characteristic information of the QoS flow, a parameter of the user equipment 200 in a discontinuous reception (DRX) mode. In order to save energy on the user equipment 200, the user equipment 200, in the DRX mode, may enter an activated state and a sleep state periodically. In the activated state, the user equipment 200 is in a wake-up mode, and can detect whether there is to-be-transmitted data and start data transmission of the to-be-transmitted data in the wake-up mode. In the sleep state, the user equipment 200 is in a sleep mode and does not transmit data. The user equipment 200 has to wait for the wake-up mode before transmitting the to-be-transmitted data. The DRX described in the present disclosure may be either a conventional DRX or an extended DRX. A period of the extended DRX is longer than that of conventional DRX.

According to an embodiment of the present disclosure, the parameter of the user equipment in DRX mode may include a DRX period. Here, the DRX period is defined as an interval between start times of two adjacent activated states. That is, the DRX period is equal to a sum of time length of one activated state and time length of one sleep state. The user equipment 200 may determine the DRX period based on the characteristic information of the QoS flow. In an example, the user equipment 200 may determine the DRX period based on the transmission period of the data service, so that the transmission period of data service is a positive integer multiple of the DRX period. For example, in a case of a transmission period T of the data service and a DRX period $T_{DRX}$, the user equipment 200 may determine $T_{DRX}$ so that there has $T=mT_{DRX}$, where m is a positive integer.

According to an embodiment of the present disclosure, the user equipment 200 may transmit the DRX period to the network side equipment through the communication unit 230.

For example, the user equipment 200 may transmit, to the network side equipment, a DRX parameter include the DRX period. Here, the network side equipment may be an AMF (access and mobility management function). After the AMF receives the DRX period from the user equipment 200, the AMF may determine the DRX period and transmits the determined DRX period to the user equipment 200. Here, the user equipment 200 may carry the DRX parameter in a registration request message. Specifically, the user equipment 200 may carry the DRX parameter using the requested DRX parameters for E-UTRA and NR, the requested DRX parameters for NB-IoT, and the extended idle mode DRX parameters in the registration request message.

As mentioned above, according to the embodiment of the present disclosure, the user equipment 200 may determine the DRX period based on the characteristic information of the QoS flow, and may negotiate the DRX period with the AMF.

According to an embodiment of the present disclosure, the user equipment 200 may transmit, to the network side equipment, a preferred DRX parameter including the DRX period. Here, the network side equipment may be base station equipment.

According to an embodiment of the present disclosure, the parameter of the user equipment in the DRX mode may further include an interval of an activated state, which may include a start time and an end time of the activated state.

According to an embodiment of the present disclosure, the user equipment 200 may determine the start time and the end time of an activated state based on the characteristic information of the QoS flow. Specifically, the user equipment 200 may determine the start time and the end time of the activated state based on the transmission start time of data of the data service in any data transmission period, so that the transmission start time of the data service in any data transmission period is not earlier than the start time of the activated state and not later than the end time of the activated state.

That is, after determining the transmission start time $T_0$ of data of the data service in any data transmission period, the user equipment 200 may determine the start time and the end time of the activated state based on $T_0$, so that $T_0$ is within the activated state (including the start time and the end time of the activated state).

According to an embodiment of the present disclosure, the user equipment 200 may transmit the interval information of the activated state to the network side equipment. For example, the user equipment 200 may transmit, to the network side equipment, a preferred DRX parameter including interval information of an activated state. Here, the interval information of the activated state may include a start time and an end time of an activated state. Alternatively, the interval information of the activated state may further include the start time of the activated state and time length of the activated state. In the present disclosure, the start time/end time may be represented by an absolute time, or the start time/end time may be represented by an offset between the start time/end time and a current time or reference time.

As mentioned above, according to an embodiment of the present disclosure, the user equipment 200 may transmit the preferred DRX parameter to base station equipment serving as the network side equipment. The preferred DRX parameter may include the DRX period and the interval information of an activated state. In this way, the base station equipment can determine the DRX parameter of the user equipment 200 based on the preferred DRX parameter.

According to an embodiment of the present disclosure, in a case that the transmission period of the data service is a positive integer multiple of the DRX period, and the transmission start time of data of the data service in any data transmission period is within an activated state, the transmission start time of the data service in each data transmission period is within an activated state. In this way, it can be ensured that the user equipment 200 is in an activated state at the transmission start time of data. Therefore, the data can be transmitted timely.

As mentioned above, according to the embodiments of the present disclosure, the user equipment 200 can transmit the DRX period to the AMF, and can send the DRX period and the interval information of the activated state to the base station equipment. Therefore, the AMF or base station is enabled to determine the DRX parameter based on the request of the user equipment 200.

3. Configuration Examples of Network Side Equipment

FIG. 4 is a block diagram showing a structure of electronic equipment 400 serving as network side equipment in a wireless communication system according to an embodiment of the present disclosure. The network side equipment here may be base station equipment, such as an eNB or gNB, in the wireless communication system.

As shown in FIG. 4, the electronic equipment 400 may include a communication unit 410, a determination unit 420, and a distribution unit 430.

Here, each unit of electronic equipment 400 may be included in processing circuitry. It should be noted that the user equipment 400 may include a single processing circuit or multiple processing circuits. Further, the processing circuitry may include various discrete functional units for performing different functions and/or operations. It should be noted that these functional units may be physical entities or logical entities, and units with different names may be implemented by a same physical entity.

According to an embodiment of the present disclosure, the electronic equipment 400 may receive, from user equipment through the communication unit 410, characteristic information of a QoS flow used for D2D communication between the user equipment and other user equipment.

According to an embodiment of the present disclosure, the determination unit 420 may determine, from the received characteristic information of the QoS flow, periodicity information and transmission time information of a data service carried by the QoS flow.

According to an embodiment of the present disclosure, the allocation unit 430 is configured to allocate resources used for the D2D communication for the user equipment according to the characteristic information.

According to an embodiment of the present disclosure, the electronic equipment 400 may periodically allocate resources to the user equipment based on the characteristic information of the QoS flow. In this way, the resources allocated by the electronic equipment 400 can better satisfy a demand of the user equipment. Therefore, a process of the network side equipment allocating resources to the user equipment is optimized.

According to an embodiment of the present disclosure, the determination unit 420 may determine a transmission period T of the data service based on the periodicity information of the data service carried by the QoS flow. For example, in a case where the periodicity information includes the transmission period T of the data service, the determination unit 420 may determine the transmission period T directly. In a case where the periodicity information includes a transmission frequency F of the data service, the determination unit 420 may determine the transmission period T of the data service as T=1/F.

According to an embodiment of the present disclosure, the determination unit 420 may determine, based on the transmission time information, a transmission start time $T_0$ of data of the data service in any data transmission period. For example, in a case where the transmission time information includes an absolute time of the transmission start time $T_0$, the determination unit 420 may determine $T_0$ directly. In a case where the transmission time information includes a time offset between the transmission start time $T_0$ and a current time when the user equipment transmits the characteristic information, the determination unit 420 may determine $T_0$ based on the time offset and the current time when the user equipment transmits the characteristic information.

According to an embodiment of the present disclosure, the characteristic information received by electronic equipment 400 may further include data size information of the data services in one data transmission period. The determination unit 420 may further determine the data size information from the received characteristic information of the QoS flow.

According to an embodiment of the present disclosure, the characteristic information received by the electronic equipment 400 may further include information indicating whether the user equipment supports an adjustment for the transmission time information. The determination unit 420 may further determine whether the user equipment supports an adjustment for the transmission time information from the received characteristic information of the QoS flow.

As mentioned above, according to an embodiment of the present disclosure, the characteristic information received by the electronic equipment 400 may include periodicity information and transmission time information. Alternatively, the characteristic information may further include: data size information of the data services in one data transmission period; and/or information indicating whether the user equipment supports an adjustment for the transmission time information.

According to an embodiment of the present disclosure, the electronic equipment 400 may receive the characteristic information of the QoS flow through RRC signaling. For example, the electronic equipment 400 may receive the characteristic information of the QoS flow through a SidelinkUElnformationNR message in RRC signaling. For example, the characteristic information of the QoS flow may be included in a QoS profile.

According to an embodiment of the present disclosure, the electronic equipment 400 may further determine, through the QoS profile, the following QoS parameters: PQI; and/or GFBR/MFBR.

According to an embodiment of the present disclosure, the allocation unit 430 may determine, based on the characteristic information, a transmission start time of data in respective data transmission periods. Specifically, the allocation unit 430 may determine the transmission start time of data in respective data transmission periods based on the transmission period T and the transmission start time $T_0$ of the data service. For example, after the transmission period T and the transmission start time $T_0$ of the data service are determined by the determination unit 420, the allocation unit 430 may determine that the transmission start time of the data in respective data transmission periods is $T_0$+nT (where n is an integer). In addition, the allocation unit 430 may determine only respective transmission start times later than the current time.

According to an embodiment of the present disclosure, the allocation unit 430 may further determine a time domain width of a transmission time window based on a QoS parameter PQI of the QoS flow. For example, the allocation unit 430 may determine the time domain width of the transmission time window based on a PDB mapped by the PQI. Here, the electronic equipment 400 needs to allocate resources to the user equipment within the transmission time window. That is, the time domain width of the resources allocated to the user equipment needs to be less than or equal to the time domain width of the transmission time window.

Furthermore, the allocation unit 430 may determine transmission time windows corresponding to the respective data transmission periods, based on the transmission start time of the data in respective data transmission periods and the time domain width of a transmission time window. For example, in a case that the time domain width of a transmission time window is W, the transmission time window corresponding to respective data transmission periods may be $[T_0+nT, T_0+nT+W]$. Here, the allocation unit 430 may determine only respective transmission time windows later than the current time.

According to an embodiment of the present disclosure, the time domain width of a transmission time window may be greater than the transmission period T of the data service, or equal to the transmission period T of the data service, or smaller than the transmission period T of the data service.

According to an embodiment of the present disclosure, the allocation unit 430 may allocate, in transmission time windows corresponding to the respective data transmission periods, resources used for the D2D communication for the user equipment based on a data size. For example, the resources allocated to the user equipment may be proportional to the data size. That is, the allocation unit 430 needs to allocate resources for the user equipment to match the data size.

According to an embodiment of the present disclosure, when allocating resources, the allocation unit 430 may allocate continuous time-domain resources to the user equipment in the transmission time window, or may allocate non-continuous time-domain resources to the user equipment in the transmission time window. Similarly, the allocation unit 430 may allocate continuous frequency-domain resources to the user equipment in the transmission time window, or may allocate discontinuous frequency domain resources to the user equipment in the transmission time window.

FIG. 5 is a schematic diagram showing allocation of continuous time-domain resources within a transmission time window, in a case that a time domain width of the transmission time window is less than T, according to an embodiment of the present disclosure. As shown in FIG. 5, the time domain width of a transmission time window is less than the transmission period T, and the resources allocated in respective transmission time windows are continuous in both a time domain and a frequency domain. Furthermore, the resources allocated in respective transmission time windows are uniform, meaning that the resources allocated in respective transmission time windows have the same shape.

Figures 6, 7, 8:
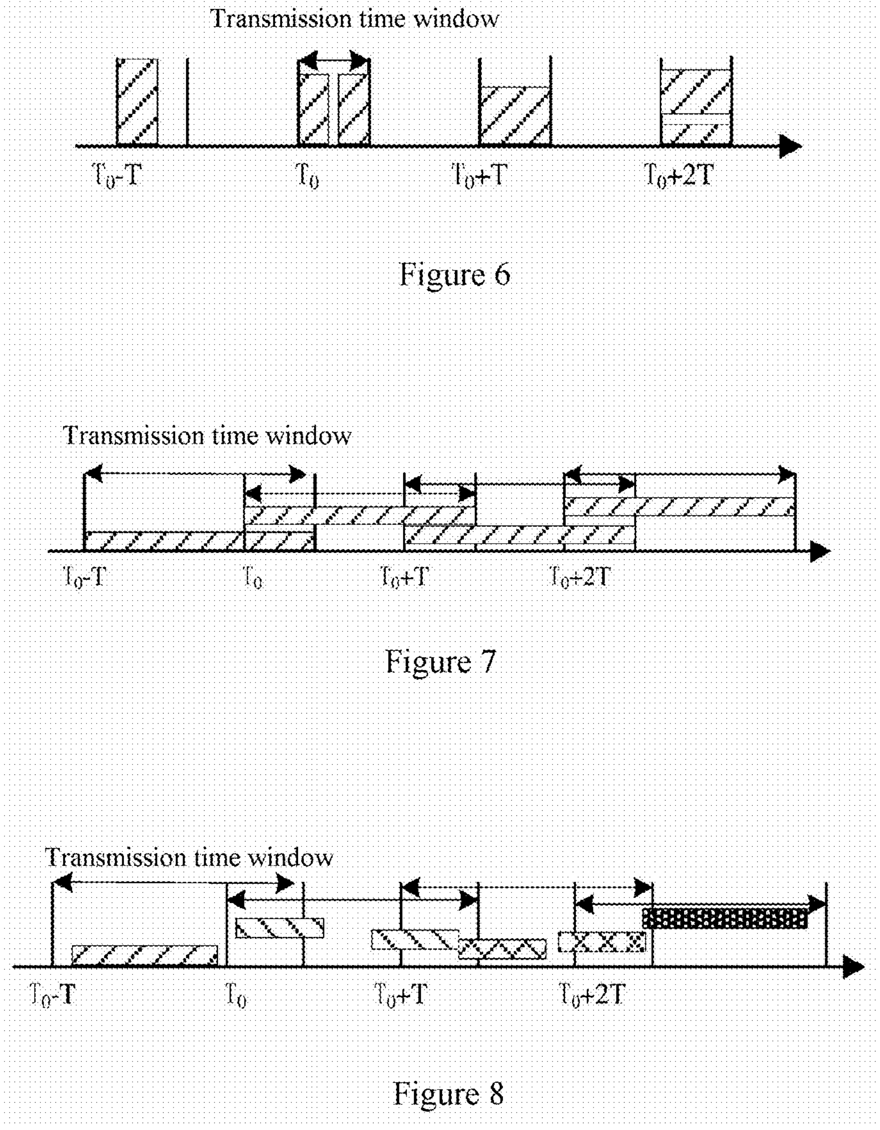
FIG. 6 is a schematic diagram showing allocation of discontinuous time-domain resources within a transmission time window, in a case that a time domain width of the transmission time window is less than T, according to an embodiment of the present disclosure.
FIG. 7 is a schematic diagram showing allocation of continuous time-domain resources within a transmission time window, in a case that a time domain width of the transmission time window is greater than T, according to an embodiment of the present disclosure.
FIG. 8 is a schematic diagram showing allocation of discontinuous time-domain resources within a transmission time window, in a case that a time domain width of the transmission time window is greater than T, according to an embodiment of the present disclosure.

FIG. 6 is a schematic diagram showing allocation of discontinuous time-domain resources within a transmission time window, in a case that a time domain width of the transmission time window is less than T, according to an embodiment of the present disclosure. As shown in FIG. 6, the time domain width of a transmission time window is less than the transmission period T. Furthermore, resources allocated in a data transmission period having $T_0-T$ as the transmission start time are continuous in both a frequency domain and a time domain; resources allocated in a data transmission period having $T_0$ as the transmission start time are continuous in the frequency domain and discontinuous in the time domain; resources allocated in a data transmission period having $T_0+T$ as the transmission start time are continuous in both the frequency domain and the time domain; resources allocated in a data transmission period having $T_0+2T$ as the transmission start time are continuous in the time domain and discontinuous in the frequency domain. In other words, the resources allocated in respective transmission time window are uneven, that is, the resources allocated in respective transmission time window have different shapes.

FIG. 7 is a schematic diagram showing allocation of continuous time-domain resources within a transmission time window in a case that a time domain width of the transmission time window is greater than T, according to an embodiment of the present disclosure. As shown in FIG. 7, the time domain width of a transmission time window is greater than the transmission period T, and resources allocated in respective transmission time windows are continuous in both a time domain and a frequency domain. Furthermore, the resources allocated in respective transmission time windows are uniform, meaning that the resources allocated in respective transmission time windows have a same shape.

FIG. 8 is a schematic diagram showing allocation of discontinuous time-domain resources within a transmission time window in a case that a time domain width of the transmission time window is greater than T, according to an embodiment of the present disclosure. As shown in FIG. 8, the time domain width of a transmission time window is greater than the transmission period T. Furthermore, resources allocated in a data transmission period having $T_0-T$ as the transmission start time are continuous in both a frequency domain and a time domain; resources allocated in a data transmission period having $T_0$ as the transmission start time are discontinuous in both the frequency domain and the time domain; resources allocated in a data transmission period having $T_0+T$ as the transmission start time are discontinuous in both the frequency domain and the time domain; resources allocated in a data transmission period having $T_0+2T$ as the transmission start time are continuous in both the time domain and the frequency domains. In other words, the resources allocated in respective transmission time windows are uneven, that is, the resources allocated in respective transmission time windows have different shapes.

In addition, according to an embodiment of the present disclosure, a time domain width of resources allocated by the allocation unit 430 in respective transmission time windows may be equal to or less than the time domain width of a transmission time window. In an example as shown in FIG. 3, the time domain width of resources allocated by the allocation unit 430 in respective transmission time windows is less than the time domain width of a transmission time window. In an example as shown in FIG. 5, the time domain width of resources allocated by the allocation unit 430 in respective transmission time windows is equal to the time domain width of a transmission time window.

According to an embodiment of the present disclosure, a size of resources allocated by the allocation unit 430 to the user equipment in respective transmission time windows is determined based on a data size.

According to an embodiment of the present disclosure, the allocation unit 430 may determine the data size based on the characteristic information of the QoS flow transmitted from the user equipment.

For example, in a case where the characteristic information of the QoS flow transmitted from the user equipment includes the data size, the determination unit 420 determines the data size from the characteristic information of the QoS flow, and transmits the data size to the allocation unit 430. For example, in a case where the characteristic information of the QoS flow transmitted from the user equipment does not include a data size, but the QoS parameter transmitted from the user equipment includes GFBR/MFBR, the allocation unit 430 may determine the data size based on the GFBR/MFBR and the periodicity information. For example, the allocation unit 430 determines a transmission frequency of data based on the periodicity information, and then divides the GFBR/MFBR by the transmission frequency of data, so as to determine the data size.

That is, in a case where the allocation unit 430 can determine the data size based on the characteristic information of the QoS flow or the QoS parameter transmitted from the user equipment, the allocation unit 430 may determine, based on the data size, a size of resources allocated to the user equipment in transmission time windows corresponding to respective data transmission periods, so that a greater data size corresponds to a greater size of the allocated resources. Therefore, a demand of the user equipment can be better satisfied, and resources can be allocated more reasonably.

According to an embodiment of the present disclosure, in a case that the characteristic information of the QoS flow transmitted from the user equipment does not include a data size and the QoS parameter transmitted from the user equipment does not include a GFBR/MFBR, the allocation unit 430 may estimate the data size based on a type of the data service; determine, based on the estimated data size, a size of resources allocated to the user equipment in transmission time windows corresponding to respective data transmission periods; and adjust the size of resources allocated to the user equipment based on usage of allocated resources by the user equipment.

According to an embodiment of the present disclosure, the allocation unit 430 may adjust the size of resources allocated to the user equipment in a next data transmission period based on usage of resources allocated in a previous data transmission period by the user equipment. For example, the allocation unit 430 may determine, based on the estimated data size, a size of resources allocated to the user equipment in a first data transmission period after a current time; adjust, based on usage of resources allocated in the first data transmission period by the user equipment, a size of resources allocated to the user equipment in a second data transmission period; adjust, based on usage of resources allocated in the second data transmission period by the user equipment, a size of resources allocated to the user equipment in a third data transmission period; and the like. Thereby, sizes of resources allocated to the user equipment in respective data transmission periods are sequentially adjusted.

According to an embodiment of the present disclosure, in a case where the user equipment uses all the resources allocated in a previous data transmission period, the allocation unit 430 may increase a size of resources allocated in a next data transmission period. In a case where the user equipment uses only a portion of the resources allocated in a previous data transmission period, the allocation unit 430 may reduce a size of resources allocated in a next data transmission period. In addition, the allocation unit 430 may further determine an increment or decrement amount of resources based on a specific size of allocated resources used by the user equipment, which is not specifically limited in the present disclosure.

Figures 9, 10, 11A:
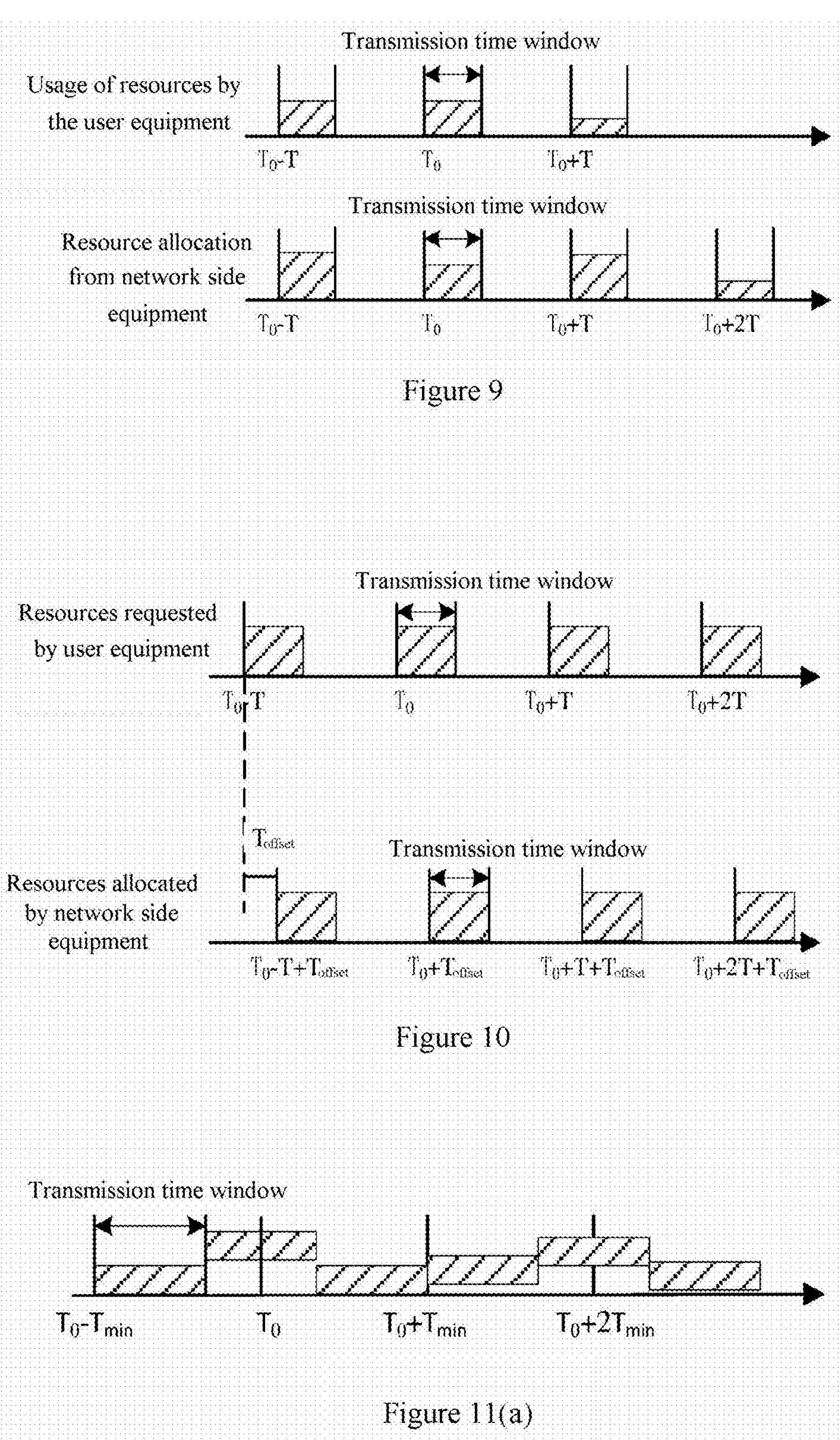
FIG. 9 is a schematic diagram showing that network side equipment adjusts allocated resources based on usage of the resources by user equipment according to an embodiment of the present disclosure.
FIG. 10 is a schematic diagram showing that network side equipment adjusts a transmission time according to an embodiment of the present disclosure.

FIG. 9 is a schematic diagram showing that network side equipment adjusts allocated resources based on usage of the resources by user equipment according to an embodiment of the present disclosure. As shown in FIG. 9, during a data transmission period having $T_0-T$ as the transmission start time, the allocation unit 430 allocates resources to the user equipment in a transmission time window based on an estimated data size. The user equipment uses only a portion of the allocated resources. Therefore, during a data transmission period having $T_0$ as the transmission start time, the allocation unit 430 reduces a size of allocated resources, that is, the size of resources allocated in the data transmission period having $T_0$ as the transmission start time is less than the size of the resources allocated in the data transmission period having $T_0-T$ as the transmission start time. Furthermore, the user equipment uses all of the allocated resources. Therefore, in the data transmission period having $T_0+T$ as the transmission start time, the allocation unit 430 increases a size of allocated resources, that is, the size of resources allocated in the data transmission period having $T_0+T$ as the transmission start time is greater than the size of the resources allocated in the data transmission period having $T_0$ as the transmission start time. Furthermore, the user equipment uses only a portion of the allocated resources. Therefore, in the data transmission period having $T_0+2T$ as the transmission start time, the allocation unit 430 reduces a size of the allocated resources, that is, the size of resources allocated in the data transmission period having $T_0+2T$ as the transmission start time is less than the size of the resources allocated in the data transmission period having $T_0+T$ as the transmission start time.

As can be seen, according to the embodiments in the present disclosure, in a case where the allocation unit 430 cannot determine the data size based on the characteristic information of the QoS flow or the QoS parameter transmitted from the user equipment, the allocation unit 430 may estimate the data size, and adjust, based on an actual usage of the user equipment, a size of resources allocated to the user equipment in transmission time windows corresponding to respective data transmission periods. Therefore, a demand of the user equipment can be better satisfied.

According to an embodiment of the present disclosure, as shown in FIG. 4, the electronic equipment 400 may further include a generation unit 440 for generating a result of resource allocation.

According to an embodiment of the present disclosure, in a case that the electronic equipment 400 can allocate periodic resources to the user equipment based on the periodicity information of the QoS flow and the transmission time information of the QoS flow can satisfy the transmission time of the user equipment, that is, the electronic equipment 400 is able to allocate periodic resources corresponding to the characteristic information of the QoS flow to the user equipment, the generation unit 440 may generate information of periodically allocated resources. The electronic equipment 400 may transmit, through the communication unit 410, the periodically allocated resources to the user equipment, so that the electronic equipment transmits D2D data periodically by using the allocated resources. Preferably, the electronic equipment 400 may carry allocated resources through SL-RNTI (SideLink Radio Network Temporary Identity) or V-RNTI (Vehicle Radio Network Temporary Identity) on PDCCH.

According to an embodiment of the present disclosure, in a case that the electronic equipment 400 is able to allocate periodic resources corresponding to the periodicity information used for the QoS flow to the user equipment, but cannot meet the transmission time of the data service, the allocation unit 430 may adjust the transmission time of the data service. The generation unit 440 may generate information of the adjusted transmission time. Furthermore, the electronic equipment 400 may transmit the adjusted transmission time of the data service to the user equipment through the communication unit 410.

The generation unit 440 may further generate information of adjusted periodically allocated resources, and the electronic equipment 400 may transmit the adjusted periodically allocated resources to the user equipment through the communication unit 410, for the electronic equipment to transmit D2D data periodically by using the allocated resources.

According to an embodiment of the present disclosure, the electronic equipment 400 may transmit, to the user equipment, an absolute value of the adjusted transmission time, or a relative value of the adjusted transmission time. For example, the allocation unit 430 may determine a time offset between a transmission start time available for periodically allocating resources to the user equipment based on the periodicity information of the QoS flow and the transmission start time reported by the user equipment. Furthermore, the electronic equipment 400 may transmit information of the time offset to the user equipment through the communication unit 410. Alternatively, the electronic equipment 400 may further transmit a time offset between the adjusted transmission start time and the current time to the user equipment through the communication unit 410. Preferably, the electronic equipment 400 may carry the adjusted transmission start time through RRC signaling.

FIG. 10 is a schematic diagram showing that network side equipment adjusts a transmission time according to an embodiment of the present disclosure. As shown in FIG. 10, the transmission start time of resources requested by the user equipment is $T_0$, and the transmission period is T. The electronic equipment 400 finds that resources cannot be allocated to the user equipment in respective data transmission periods having $T_0+nT$ as the transmission start time, but can be allocated to the user equipment in respective data transmission periods having $T_0+nT+T_{offset}$ as the transmission start time. Therefore, the electronic equipment 400 may transmit any of the following information to the user equipment, as the adjusted transmission time of the data service: an absolute time of $T_0+T_{offset}$, a time interval between $T_0+T_{offset}$ and a current time, and $T_{offset}$.

According to an embodiment of the present disclosure, in a case where the characteristic information of the QoS flow transmitted from the user equipment includes information indicating whether the user equipment supports an adjustment for the transmission time information, the determination unit 420 may determine, based on the information, whether the user equipment supports an adjustment for the transmission time information. In a case where the user equipment supports an adjustment for the transmission time information, the allocation unit 430 may adjust the transmission time of the data service as described above. In a case where the user equipment does not support an adjustment for the transmission time information, the allocation unit 430 may determine that it is impossible to allocate periodic resources corresponding to the characteristic information of the QoS flow used for the D2D communication for the user equipment, and the generation unit 440 may generate information indicating incapacity of allocating resources as described below.

According to an embodiment of the present disclosure, in a case where the electronic equipment 400 is unable to allocate the user equipment with periodic resources corresponding to the characteristic information of the QoS flow used for the D2D communication, the generation unit 440 may generate information indicating incapacity of allocating resources. Furthermore, the electronic equipment 400 may transmit the information generated by the generation unit 440 to the user equipment through the communication unit 410. Preferably, the electronic equipment 400 may carry the information through RRC signaling.

According to an embodiment of the present disclosure, in a case where the electronic equipment 400 receives the updated characteristic information of the QoS flow from the user equipment, the allocation unit 430 may allocate resources to the user equipment using the updated characteristic information, that is, allocate resources to the user equipment through any of the methods described above, which is not further described here.

According to an embodiment of the present disclosure, in a case where the electronic equipment 400 receives, from the user equipment, request information for requesting the electronic equipment 400 to allocate resources to the user equipment throughout a time domain, the determination unit 420 may determine, from the request information, a minimum transmission period $T_{min}$ or a maximum transmission frequency $F_{max}$ of the data service carried by the QoS flow included in the request information. In a case where the request information includes the maximum transmission frequency $F_{max}$ of the data service, the determination unit 420 may determine the minimum transmission period $T_{min}$ based on the maximum transmission frequency $F_{max}$, i.e., $T_{min}=1/Fmax$.

According to an embodiment of the present disclosure, the allocation unit 430 may allocate, in respective resource allocation periods, resources used for the D2D communication for the user equipment based on a size of the data service, by taking a minimum from a size of a transmission time window and the minimum transmission period $T_{min}$ as a resource allocation period and taking the size of the transmission time window as a time domain width of the allocated resources.

According to an embodiment of the present disclosure, in a case where the size of the transmission time window is less than the minimum transmission period $T_{min}$, the allocation unit 430 may allocate, in respective resource allocation periods, resources used for the D2D communication for the user equipment based on a size of the data service, by taking the size of the transmission time window as the resource allocation period and taking the size of the transmission time window as the time domain width of the allocated resources. That is, resource allocation for the user equipment is performed throughout the time domain, and the resources allocated throughout the time domain are divided in unit of the size of the transmission time window, with each block of resources corresponding to the size of the data service. Here, a starting point for resource allocation may be a latest transmission start time after a current time.

FIG. 11(*a*) is a schematic diagram showing that network side equipment allocates resources to user equipment throughout a time domain in a case that a time domain width of a transmission time window is less than $T_{min}$ according to an embodiment of the present disclosure. Here, it is assumed that a latest transmission start time after a current time is $T_0-T_{min}$. As shown in FIG. 11(*a*), starting from $T_0-T_{min}$, resources are allocated by taking a size of the transmission time window as a resource allocation period and taking a size of a transmission time window as a time domain width of the allocated resources. The size of each resource block is determined based on the size of the data service.

According to an embodiment of the present disclosure, in a case where the size of a transmission time window is greater than the minimum transmission period $T_{min}$, the allocation unit 430 may allocate, in respective resource allocation periods, resources used for the D2D communication for the user equipment based on a size of the data service, by taking the minimum transmission period Ti as the resource allocation period and taking a size of the transmission time window is determined as a time domain width of allocated resources. That is, resource allocation to the user equipment is performed throughout a time domain, with each block of resources corresponding to the size of the data service. Here, a starting point for resource allocation may be a latest transmission start time after a current time.

FIG. 11(*b*) is a schematic diagram showing that network side equipment allocates resources to user equipment throughout a time domain in a case that a time domain width of a transmission time window is greater than Ti according to an embodiment of the present disclosure. Here, it is assumed that a latest transmission start time after a current time is $T_0-T_{min}$. As shown in FIG. 11(*b*), starting from $T_0$-$T_{min}$, resources are allocated by taking $T_{min}$ as a resource allocation period and a size of a transmission time window as a time domain width of allocated resources. The size of each block of resources is determined based on a size of data of (transmitted through) the data service.

According to an embodiment of the present disclosure, in a case where the electronic equipment 400 receives, from the user equipment, request information for requesting the electronic equipment 400 to allocate resources to the user equipment throughout a time domain, the electronic equipment 400 may determine, based on a congestion level of resources managed by the electronic equipment, an operator policy, and other information, whether to allocate resources to the user equipment throughout the time domain; allocate resources as mentioned in the above embodiments, on determining that resources can be allocated to the user equipment throughout the time domain; and transmit, to the user equipment, information indicating refusal to allocating resources to the user equipment throughout the time domain, on determining that resources cannot be allocated to the user equipment throughout the time domain.

Figures 11B, 12:
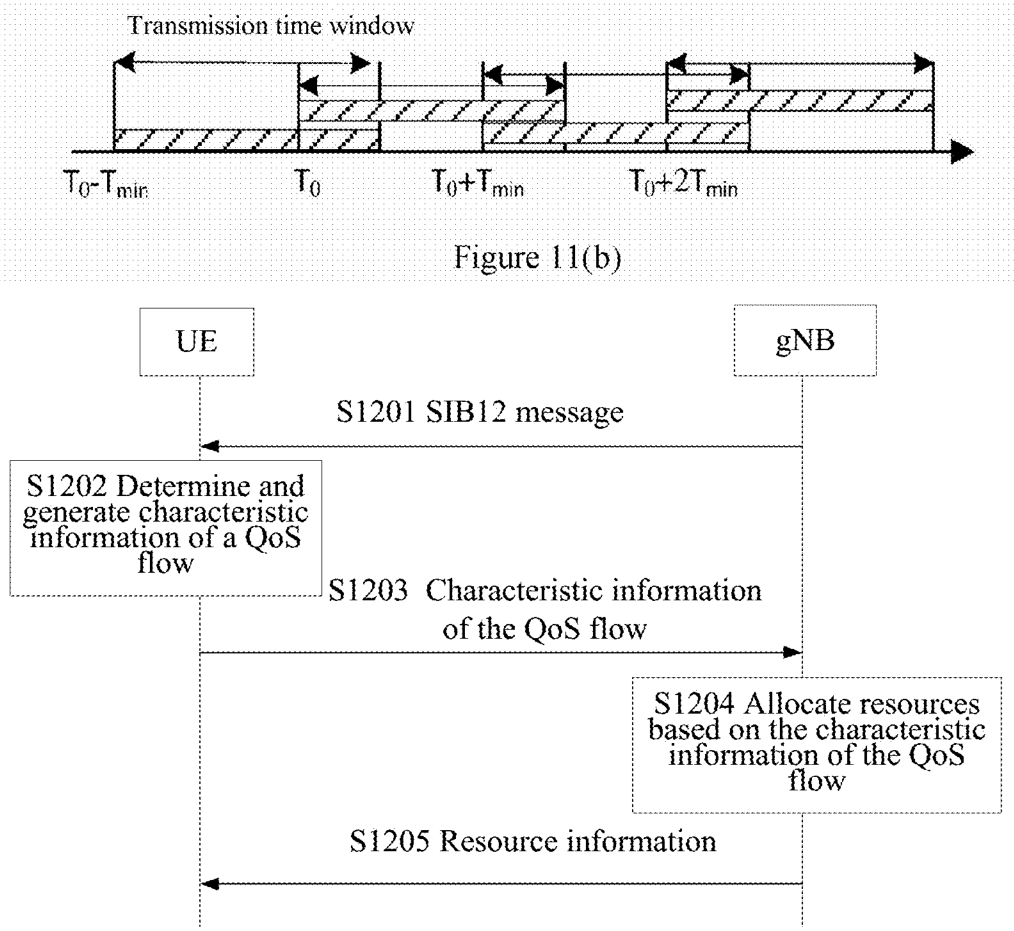
FIG. 12 is a signaling flow illustrating a process of network side equipment allocating resources to user equipment according to an embodiment of the present disclosure.

FIG. 12 is a signaling flow illustrating a process of network side equipment allocating resources to user equipment according to an embodiment of the present disclosure. In FIG. 12, UE may be implemented by the electronic equipment 200, and a gNB may be implemented by the electronic equipment 400. As shown in FIG. 12, in step S1201, the gNB transmits a SIB12 message to the UE. In step S1202, the UE determines and generates characteristic information of a QoS flow used for D2D communication. In step S1203, the UE transmits the characteristic information of the QoS flow to the gNB. In step S1204, the gNB allocates resources to the UE periodically based on the characteristic information of the QoS flow. Assuming that the gNB is able to allocate, to the UE, periodic resources that satisfy the characteristic information of the QoS flow, the gNB transmits, in step S1205, information of allocated resource to the UE.

Figure 13:
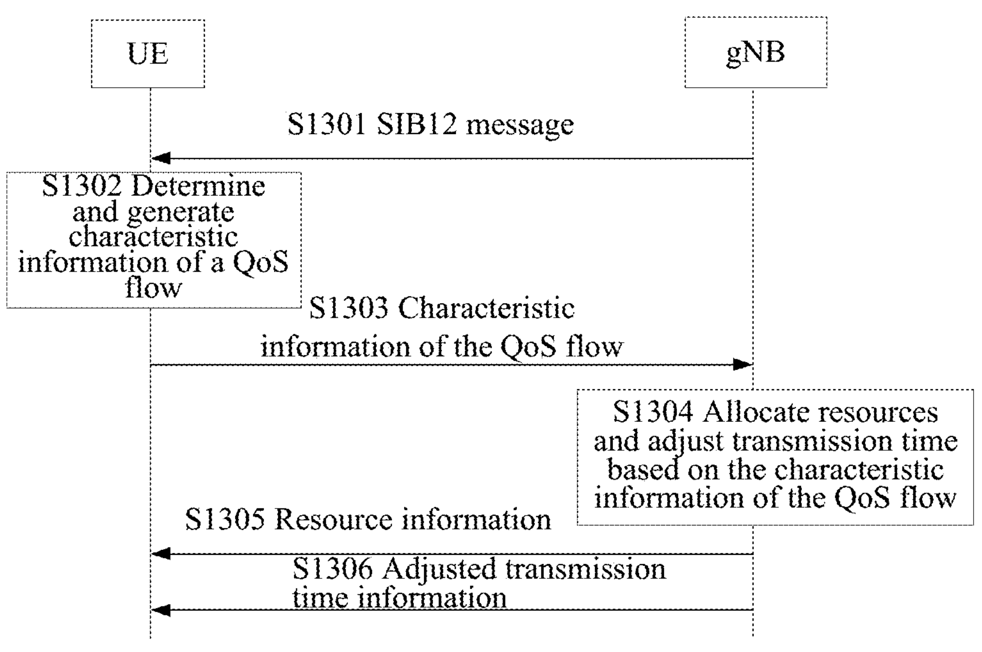
FIG. 13 is a signaling flow illustrating a process of network side equipment allocating resources to user equipment according to another embodiment of the present disclosure.

FIG. 13 is a signaling flow illustrating a process of network side equipment allocating resources to user equipment according to another embodiment of the present disclosure. In FIG. 13, UE may be implemented by the electronic equipment 200, and a gNB may be implemented by the electronic equipment 400. As shown in FIG. 13, in step S1301, the gNB transmits a SIB12 message to the UE. In step S1302, the UE determines and generates characteristic information of a QoS flow used for D2D communication. In step S1303, the UE transmits the characteristic information of the QoS flow to the gNB. In step S1304, the gNB allocates resources to the UE periodically based on the characteristic information of the QoS flow. Assuming that the gNB is able to allocate periodic resources to the UE but needs to adjust transmission time information, the gNB adjusts a transmission time. In step S1305, the gNB transmits information of allocated resource to the UE. In step S1306, the gNB transmits the adjusted transmission time information to the UE. Here, the gNB may transmit, to the UE, the information of allocated resources and the adjusted transmission time information.

Figure 14:
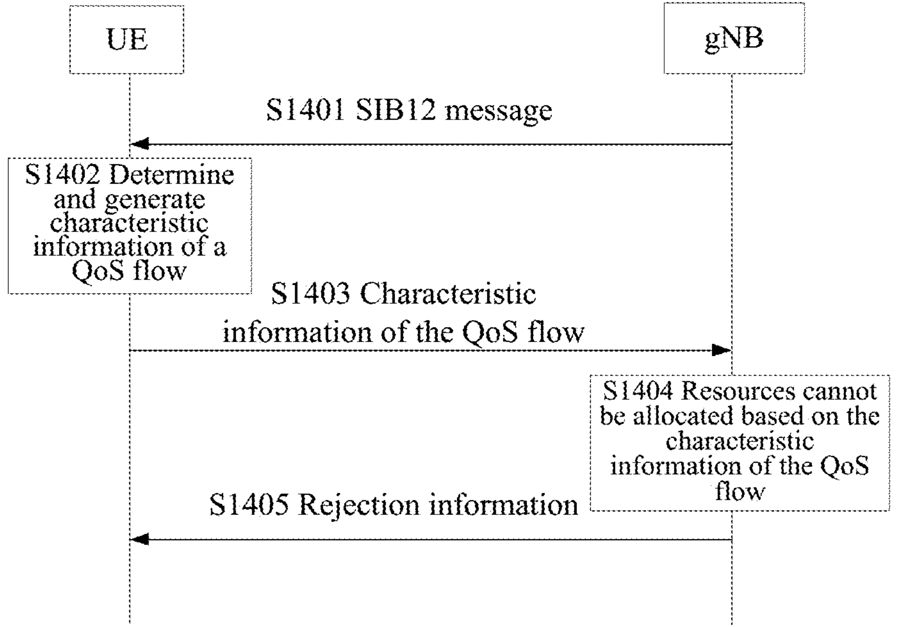
FIG. 14 is a signaling flow illustrating a process of network side equipment allocating resources to user equipment according to another embodiment of the present disclosure.

FIG. 14 is a signaling flow illustrating a process of network side equipment allocating resources to user equipment according to another embodiment of the present disclosure. In FIG. 14, a UE may be implemented by the electronic equipment 200, and a gNB may be implemented by the electronic equipment 400. As shown in FIG. 14, in step S1401, the gNB transmits a SIB12 message to the UE. In step S1402, the UE determines and generates characteristic information of a QoS flow used for D2D communication. In step S1403, the UE transmits the characteristic information of the QoS flow to the gNB. In step S1404, the gNB allocates resources to the UE periodically based on the characteristic information of the QoS flow. It is assumed here that the gNB cannot allocate periodic resources to the UE. In step S1405, the gNB transmits, to the UE, a rejection message indicating incapacity of allocating resources satisfying the characteristic information of the QoS flow for the UE.

As mentioned above, according to the embodiments of the present disclosures, the electronic equipment 400 can allocate resources to the user equipment periodically based on the characteristic information of the QoS flow. In this way, resources allocated by the electronic equipment 400 can better satisfy a demand of the user equipment. Therefore, the process of the network side equipment allocating resources to the user equipment is optimized. Furthermore, the electronic equipment 400 can determine, based on a data size, a size of resources allocated to the user equipment. In a case where the data size cannot be determined from the characteristic information of the QoS flow or the QoS parameter transmitted from the user equipment, the electronic equipment 400 can estimate the data size and adjust allocated resources based on an actual usage of resources by the user equipment, so that the demand of the user equipment is better satisfied. In addition, in a case where the electronic equipment 400 can allocate resources to the user equipment periodically but needs to adjust a transmission time, the electronic equipment 400 can adjust the transmission time to meet a demand of periodic data transmission of the user equipment as much as possible. Furthermore, in a case that a non-fixed change occurs in the characteristic information of the QoS flow of the user equipment and the user equipment requests the electronic equipment 400 to allocate resources throughout the time domain, the electronic equipment 400 can allocate resources for the user equipment throughout the time domain, so that there are available resources no matter when the user equipment transmits data. In summary, according to the embodiments of the present disclosures, resources for the D2D communication can be allocated to the user equipment based on the characteristic information of the QoS flow, so that the process of the electronic equipment 400 allocating resources to the user equipment can be optimized.

According to an embodiment of the present disclosure, the electronic equipment 400 may further determine, based on the characteristic information of the QoS flow, a parameter of the user equipment in a DRX mode.

According to an embodiment of the present disclosure, the electronic equipment 400 may transmit the parameter of the user equipment in the DRX mode to the user equipment through the communication unit 410. For example, the electronic equipment 400 may carry the parameter of the user equipment in the DRX mode through RRC signaling.

According to an embodiment of the present disclosure, the parameter of the user equipment in the DRX mode may include a DRX period. The electronic equipment 400 may determine the DRX period based on the transmission period of the data service, so that the transmission period of the data service is a positive integer multiple of the DRX period. For example, in a case of a transmission period T of the data service and a DRX period $T_{DRX}$, the electronic equipment 400 may determine $T_{DRX}$ so that there has $T=mT_{DRX}$, where m is a positive integer.

According to an embodiment of the present disclosure, the parameter of the user equipment in the DRX mode may further include interval information of an activated state. For example, the interval information of an activated state may include a start time and an end time of the activated state.

The electronic equipment 400 may determine the start time and the end time of the activated state based on a transmission start time of data of the data service in any data transmission period, so that the transmission start time of data of the data service in any data transmission period is not earlier than the start time of the activated state and not later than the end time of the activated state.

Alternatively, the interval information of an activated state may include a start time and duration of the activated state.

According to an embodiment of the present disclosures, the electronic equipment 400 may represent the start time/end time by using an absolute time, or may represent the start time/end time by using an offset between the start time/end time and a current time or reference time.

As mentioned above, according to the embodiments disclosed in this disclosure, in a case that the transmission period of the data service is a positive integer multiple of the DRX period, and the transmission start time of data of the data service in any data transmission period is within an activated state (including the start time and the end time of the activated state), the transmission start times of data of the data service in respective data transmission periods are within an activated state. In this way, it is ensured that the user equipment is in the activated state at the transmission start time of data, so that the data can be transmitted timely.

According to an embodiment of the present disclosure, the electronic equipment 400 may determine the start time and the end time of the activated state, so that an end time of a transmission time window of the data service in any data transmission period is not earlier than the start time of the activated state and not later than the end time of the activated state.

That is, not only the transmission start time of the data is within the activated state (including the start time and the end time of the activated state), but also an end time of the transmission time window is within the activated state (including the start time and the end time of the activated state). In this way, the user equipment is in the activated state throughout the data transmission process of the user equipment, so that the data can be transmitted timely.

According to an embodiment of the present disclosure, the DRX parameter may further include a time length of an inactivity period of the DRX of the user equipment. The user equipment does not enter the sleep state during the time length of the inactivity period in a case that there is to-be-transmitted data detected by the user equipment in the activated state. Here, the time length of the inactivity period may be represented by using a parameter drx-Inactivity-timer.

According to an embodiment of the present disclosure, the electronic equipment 400 may determine the time length of the inactivity period of the DRX of the user equipment, so that the time length of the inactivity period is greater than or equal to a length of a transmission time window of the data service in any data transmission period. In this way, it can ensure that the user equipment is in the activated state throughout the data transmission process, so that the data can be transmitted timely.

As mentioned above, according to the embodiments of the present disclosure, the electronic equipment 400 can determine, based on the characteristic information of the QoS flow, the parameter of the user equipment in the DRX mode.

According to an embodiment of the present disclosure, the electronic equipment 400 may receive, from the user equipment, a preferred DRX parameter, and determine the parameter of the user equipment in the DRX mode based on the preferred DRX parameter.

According to an embodiment of the present disclosures, the preferred DRX parameter may include a DRX period expected for the user equipment, and a start time and an end time of an activated state expected for the user equipment. The parameter of the user equipment in the DRX mode determined by the electronic equipment 400 may include the DRX period and interval information of an activated state.

According to an embodiment of the present disclosure, the electronic equipment 400 may determine the preferred DRX parameter transmitted from the user equipment directly as the parameter of the user equipment in the DRX mode. Alternatively, the electronic equipment 400 may perform adjustment based on the preferred DRX parameter transmitted from the user equipment, so as to determine the parameter of the user equipment in the DRX mode. Alternatively, the electronic equipment 400 may ignore the preferred DRX parameter transmitted from the user equipment and determine the parameter of the user equipment in the DRX mode directly based on the characteristic information of the QoS flow.

As mentioned above, the electronic equipment 400 can determine the parameter of the user equipment in the DRX mode reasonably based on the characteristic information of the QoS flow.

4. Method Embodiments

Hereinafter a wireless communication method executed by the user equipment 200 in a wireless communication system according to an embodiment of the present disclosure is described in detail.

Figures 15, 16:
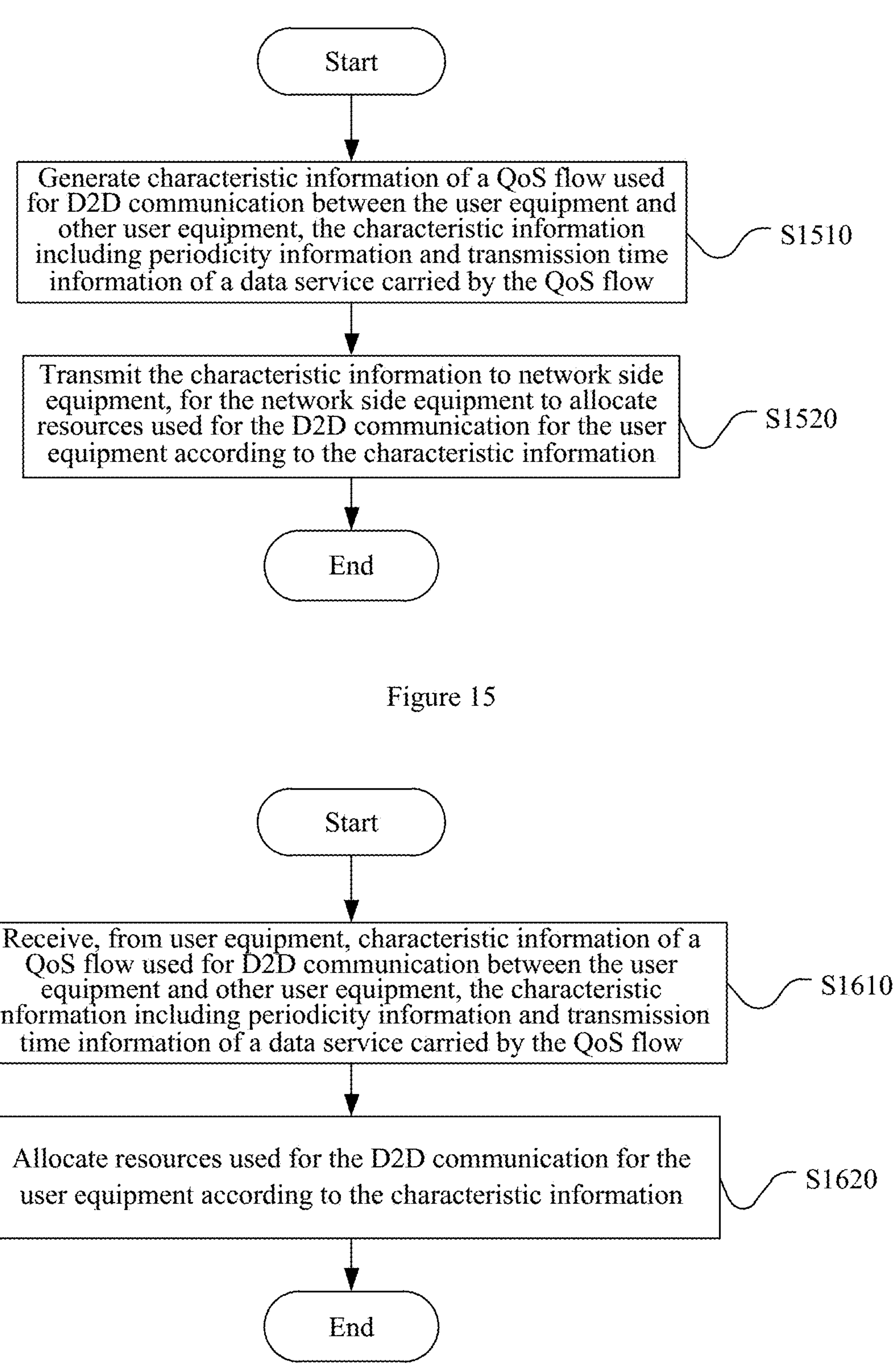
FIG. 15 is a flowchart illustrating a wireless communication method executed by user equipment according to an embodiment of the present disclosure.
FIG. 16 is a flowchart illustrating a wireless communication method executed by electronic equipment serving as network side equipment according to an embodiment of the present disclosure.

FIG. 15 is a flowchart illustrating a wireless communication method executed by user equipment 200 in a wireless communication system according to an embodiment of the present disclosure.

Reference is made to FIG. 15. In step S1510, characteristic information of a QoS flow used for D2D communication between the user equipment 200 and other user equipment is generated. The characteristic information includes periodicity information and transmission time information of a data service carried by the QoS flow.

Next, in step S1520, the characteristic information is transmitted to network side equipment, for the network side equipment to allocate resources used for the D2D communication for the user equipment 200 according to the characteristic information.

Preferably, the periodicity information includes a transmission period of the data services or a transmission frequency of the data service, and the transmission time information includes a transmission start time of data of the data service in any data transmission period.

Preferably, the characteristic information further includes: data size information of the data service in one data transmission period; and/or information representing whether the user equipment 200 supports an adjustment for the transmission time information.

Preferably, a process of generating characteristic information of a QoS flow includes: determining the characteristic information at an application layer of the user equipment 200 and transferring the characteristic information to a NAS layer of the user equipment 200.

Preferably, a process of generating characteristic information of a QoS flows includes: generating, at an application layer of the user equipment 200, indication information indicating that transmission of the data service has periodicity; and determining, at a NAS layer of the user equipment 200, the characteristic information of the QoS flow according to historical data of the data service on the QoS flow.

Preferably, a process of transmitting the characteristic information to network side equipment includes: carrying the characteristic information through RRC signaling.

Preferably, the wireless communication method further includes: generating updated characteristic information of the QoS flow, in a case that a fixed change occurs in the characteristic information of the QoS flow; and transmitting the updated characteristic information of the QoS flow to the network side equipment.

Preferably, the wireless communication method further includes: generating request information for requesting the network side equipment to allocate resources to the user equipment 200 throughout a time domain, in a case that a non-fixed changes occurs in the characteristic information of the QoS flow, wherein the request information includes a minimum transmission period or maximum transmission frequency of data carried by the QoS flow; and transmitting the request information to the network side equipment.

Preferably, the wireless communication method further includes: determining, based on the characteristic information of the QoS flow, a parameter of the user equipment in a discontinuous reception, DRX, mode, where the user equipment enters an activated state and a sleep state periodically when in the DRX mode.

Preferably, the parameters of the user equipment in the DRX mode includes a DRX period, and the wireless communication method further includes: determining the DRX period based on the transmission period of the data service, so that the transmission period of the data service is a positive integer multiple of the DRX period; and transmitting the DRX period to the network side equipment.

Preferably, the parameter of the user equipment in the DRX mode includes a start time and an end time of an activated state, and the wireless communication method further includes: determining the start time and the end time of the activated state based on the transmission start time of data of the data service in any data transmission period, so that the transmission start time of data of the data service in any data transmission period is not earlier than the start time of the activated state and not later than the end time of the activated state; and transmitting the start time and the end time of the activated state to the network side equipment.

According to an embodiment of the present disclosure, a subject that executes the above method may be the user equipment 200 according to an embodiment of the present disclosure. Therefore, the above embodiments of the user equipment 200 are applicable here.

Hereinafter a wireless communication method executed by electronic equipment 400 serving as network side equipment in a wireless communication system according to an embodiment of the present disclosure is described in detail.

FIG. 16 is a flowchart illustrating a wireless communication method executed by electronic equipment 400 serving as network side equipment in a wireless communication system according to an embodiment of the present disclosure.

Reference is made to FIG. 16. In step S1610, characteristic information of a QoS flow used for D2D communication between user equipment and other user equipment is received from the user equipment. The characteristic information includes periodicity information and transmission time information of a data service carried by the QoS flow.

Next, in step S1620, resources used for the D2D communication is allocated for the user equipment based on the characteristic information.

Preferably, the periodic information includes a transmission period of the data service or a transmission frequency of the data service, and the transmission time information includes a transmission start time of data of the data service in any data transmission period.

Preferably, the characteristic information further includes: data size information of the data service in one data transmission period; and/or information representing whether the user equipment supports an adjustment for the sending time information.

Preferably, the wireless communication method further includes: determining, based on the characteristic information, a transmission start time of data in respective data transmission periods; determining, based on the transmission start time of data in respective data transmission periods, transmission time windows corresponding to the respective data transmission periods; and allocating, in transmission time windows corresponding to the respective data transmission periods, resources used for the D2D communication for the user equipment based on a data size.

Preferably, the wireless communication method further includes: determining the data size based on characteristic information; and determining, based on the data size, a size of the resources allocated to the user equipment in the transmission time windows corresponding to the respective data transmission periods.

Preferably, the wireless communication method further includes: estimating the data size based on a type of the data service; determining, based on the estimated data size, a size of the resources allocated to the user equipment in the transmission time windows corresponding to the respective data transmission periods; and adjusting the size of the resources allocated to the user equipment based on usage of allocated resources by the user equipment.

Preferably, the wireless communication method further includes: adjusting a transmission time of the data service, in a case that the electronic equipment 400 is able to allocate the user equipment with periodic resources corresponding to the characteristic information of the QoS flow used for the D2D communication, and is not able to satisfy the transmission time of the data service; and transmitting the adjusted transmission time of the data service to the user equipment.

Preferably, the wireless communication method further includes: generating information indicating incapacity of allocating resources, in a case that the electronic equipment 400 is unable to allocate the user equipment with periodical resources corresponding to the characteristic information of the QoS flow used for the D2D communication; and transmitting the information to the user equipment.

Preferably, the wireless communication method further includes: receiving, from the user equipment, request information for requesting the electronic equipment 400 to allocate resources to the user equipment throughout a time domain, where the request information includes a minimum transmission period or maximum transmission frequency of the data service carried by the QoS flow; and allocating, in respective resource allocation periods, resources used for the D2D communication for the user equipment based on a size of the data service, by taking a minimum from a size of a transmission time window and the minimum transmission period as a resource allocation period and taking the size of the transmission time window as a time domain width of the allocated resources.

Preferably, the wireless communication method further includes: determining, based on the characteristic information of the QoS flow, a parameter of the user equipment in a discontinuous reception, DRX, mode, wherein the user equipment enters an activated state and a sleep state periodically when in the DRX mode; and transmitting, to the user equipment, the parameter of the user equipment in the DRX mode.

Preferably, the parameter of the user equipment in the DRX mode includes a DRX period, and the wireless communication method further includes: determining the DRX period based on the transmission period of the data service, so that the transmission period of the data service is a positive integer multiple of the DRX period.

Preferably, the parameter of the user equipment in the DRX mode includes a start time and an end time of an activated state, and the wireless communication method further includes: determining the start time and the end time of the activated state based on the transmission start time of data of the data service in any data transmission period, so that the transmission start time of data of the data service in any data transmission period is not earlier than the start time of the activated state and not later than the end time of the activated state.

Preferably, the wireless communication method further includes: determining the start time and the end time of the activated state based on an end time of a transmission time window of the data service in any data transmission period, so that the end time of the transmission time window of the data service in any data transmission period is not earlier than the start time of the activated state and not later than the end time of the activated state.

Preferably, the wireless communication method further includes: determining a time length of an inactivity period of the DRX of the user equipment, so that the time length of the inactivity period is greater than or equal to a length of a transmission time window of the data service in any data transmission period, wherein the user equipment does not enter the sleep state during the time length of the inactivity period in a case that there is to-be-transmitted data detected by the user equipment in the activated state.

Preferably, the wireless communication method further includes: receiving, from the user equipment, a preferred discontinuous reception, DRX, parameter, wherein the preferred DRX parameter includes a DRX period expected for the user equipment and a start time and an end time of an activated state expected for the user equipment; determining, based on the preferred DRX parameter, a parameter of the user equipment in a DRX mode, wherein the parameter of the user equipment in the DRX mode includes a DRX period and a start time and an end time of an activated state; and transmitting, to the user equipment, the parameter of the user equipment in a DRX mode.

According to the embodiments of the present disclosure, a subject that executes the above method may be the electronic equipment 400 according to the embodiments disclosed herein. Therefore, above embodiments of the electronic equipment 400 are all applicable here.

5. Application Examples

Technology of the present disclosure is applicable to various products.

For example, the network side equipment may be implemented as a macro eNB or a small eNB, or may be implemented as a gNB (a base station in a 5G system) in any type. The small eNB may be an eNB covering a cell smaller than a macro cell, such as a pico eNB, a micro eNB, or a home (femto) eNB. Alternatively, the base station may be implemented as any other type of base station, such as a NodeB or a base transceiver station (BTS). The base station may include a body (which is also referred to as base station equipment) configured to control wireless communication and one or more remote radio heads (RRHs) that are arranged in a different place from the body.

The user equipment may be implemented as a mobile terminal (such as a smartphone, a tablet personal computer (PC), a notebook PC, a portable game terminal, wearable device such as a smart watch, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

Application Examples of a Base Station

First Application Example

Figure 17:
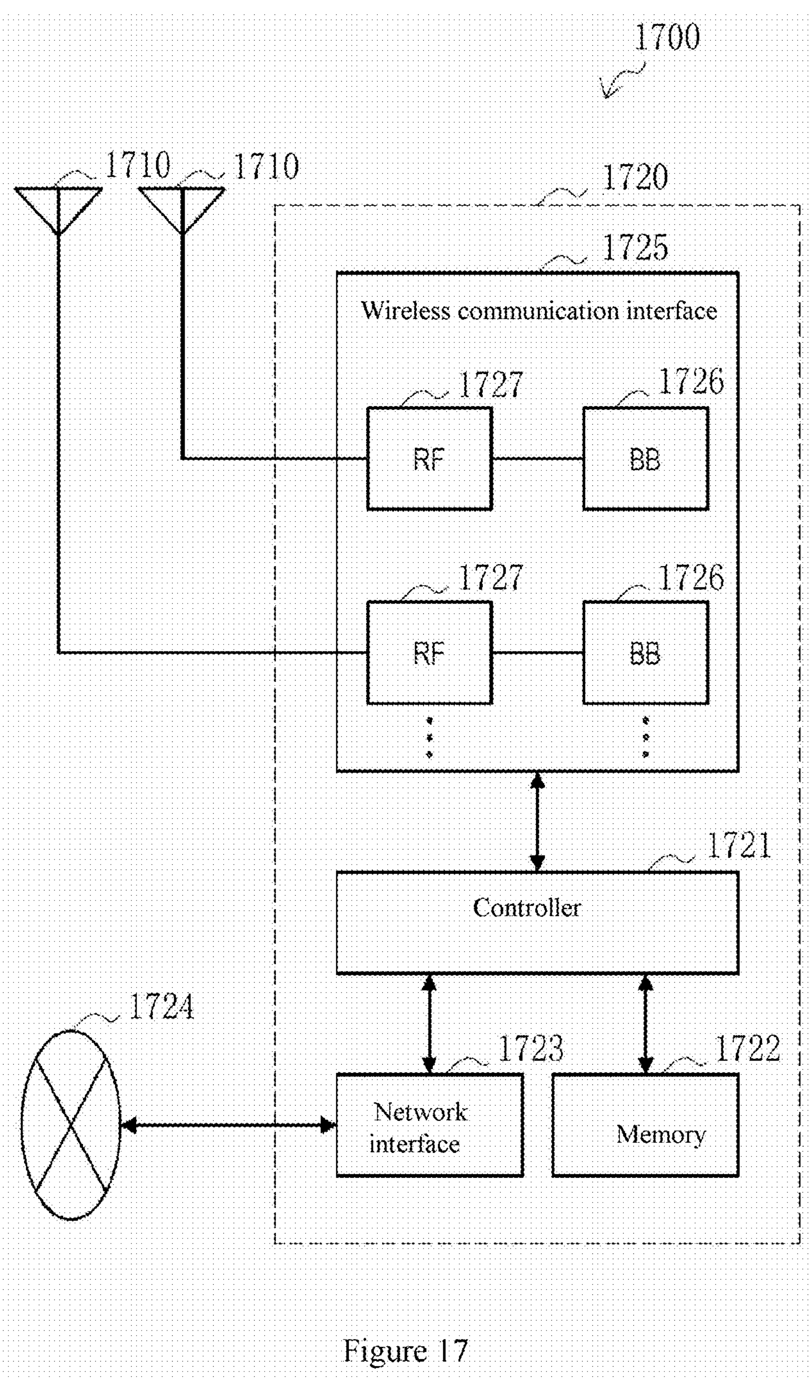
FIG. 17 is a block diagram showing a first example of a schematic configuration of an Evolved Node B (eNB)

FIG. 17 is a block diagram showing a first example of a schematic configuration of an eNB to which the technology of the present disclosure may be applied. The eNB 1700 includes a single or multiple antennas 1710 and base station equipment 1720. The base station equipment 1720 and each of the antennas 1710 may be connected to each other via a RF cable.

Each of the antennas 1710 includes a single or multiple antenna elements (such as multiple antenna elements included in a multiple-input multiple-output (MIMO) antenna), and are used for transmitting and receiving wireless signals by the base station equipment 1720. The eNB 1700 may include multiple antennas 1710, as shown in FIG. 17. For example, the multiple antennas 1710 may be compatible with multiple frequency bands used by the eNB 1700. Although FIG. 17 shows an example in which the eNB 1700 includes multiple antennas 1710, the eNB 1700 may include a single antenna 1710.

The base station equipment 1720 includes a controller 1721, a memory 1722, a network interface 1723, and a wireless communication interface 1725.

The controller 1721 may be, for example, a CPU or a DSP, and operates various high-level functions of the base station equipment 1720. For example, the controller 1721 generates a data packet according to data in a signal processed by the wireless communication interface 1725, and transfers the generated packet via the network interface 1723. The controller 1721 may bundle data from multiple baseband processors to generate a bundled packet, and transfer the generated bundled packet. The controller 1721 may have logical functions of performing control such as radio resource control, radio bearer control, mobility management, admission control, and scheduling. The control may be performed in conjunction with an adjacent eNB or a core network node. The memory 1722 includes a RAM and a ROM, and stores a program executed by the controller 1721, and various types of control data (such as a terminal list, transmission power data, and scheduling data).

The network interface 1723 is a communication interface for connecting the base station equipment 1720 to a core network 1724. The controller 1721 may communicate with a core network node or another eNB via the network interface 1723. In this case, the eNB 1700, and the core network node or the other eNB may be connected to each other through a logical interface (such as an S1 interface and an X2 interface). The network interface 1723 may be a wired communication interface or a wireless communication interface for a wireless backhaul line. In a case that the network interface 1723 is a wireless communication interface, the network interface 1723 may use a higher frequency band for wireless communication than a frequency band used by the wireless communication interface 1725.

The wireless communication interface 1725 supports any cellular communication scheme (such as Long Term Evolution (LTE) and LTE-Advanced), and provides wireless connection to a terminal positioned in a cell of the eNB 1700 via the antenna 1710. The wireless communication interface 1725 may typically include, for example, a baseband (BB) processor 1726 and an RF circuit 1727. The BB processor 1726 may perform, for example, coding/decoding, modulation/demodulation and multiplexing/de-multiplexing, and perform various types of signal processes of layers (for example, L1, media access control (MAC), radio link control (RLC) and packet data convergence protocol (PDCP)). Instead of the controller 1721, the BB processor 1726 may have a part or all of the above logical functions. The BB processor 1726 may be a memory storing a communication control program, or a module including a processor and a related circuit configured to execute the program. Updating the program may change the functions of the BB processor 1726. The module may be a card or a blade inserted into a slot of the base station equipment 1720. Alternatively, the module may be a chip mounted on the card or the blade. In addition, the RF circuit 1727 may include, for example, a frequency mixer, a filter or an amplifier, and transmits and receives wireless signals via the antenna 1710.

As shown in FIG. 17, the wireless communication interface 1725 may include multiple BB processors 1726. For example, the multiple BB processors 1726 may be compatible with multiple frequency bands used by the eNB 1700. As shown in FIG. 17, the wireless communication interface 1725 may include multiple RF circuits 1727. For example, the multiple RF circuits 1727 may be compatible with multiple antenna elements. Although FIG. 17 shows an example in which the wireless communication interface 1725 includes multiple BB processors 1726 and multiple RF circuits 1727, the wireless communication interface 1725 may include a single BB processor 1726 or a single RF circuit 1727.

Second Application Example

Figure 18:
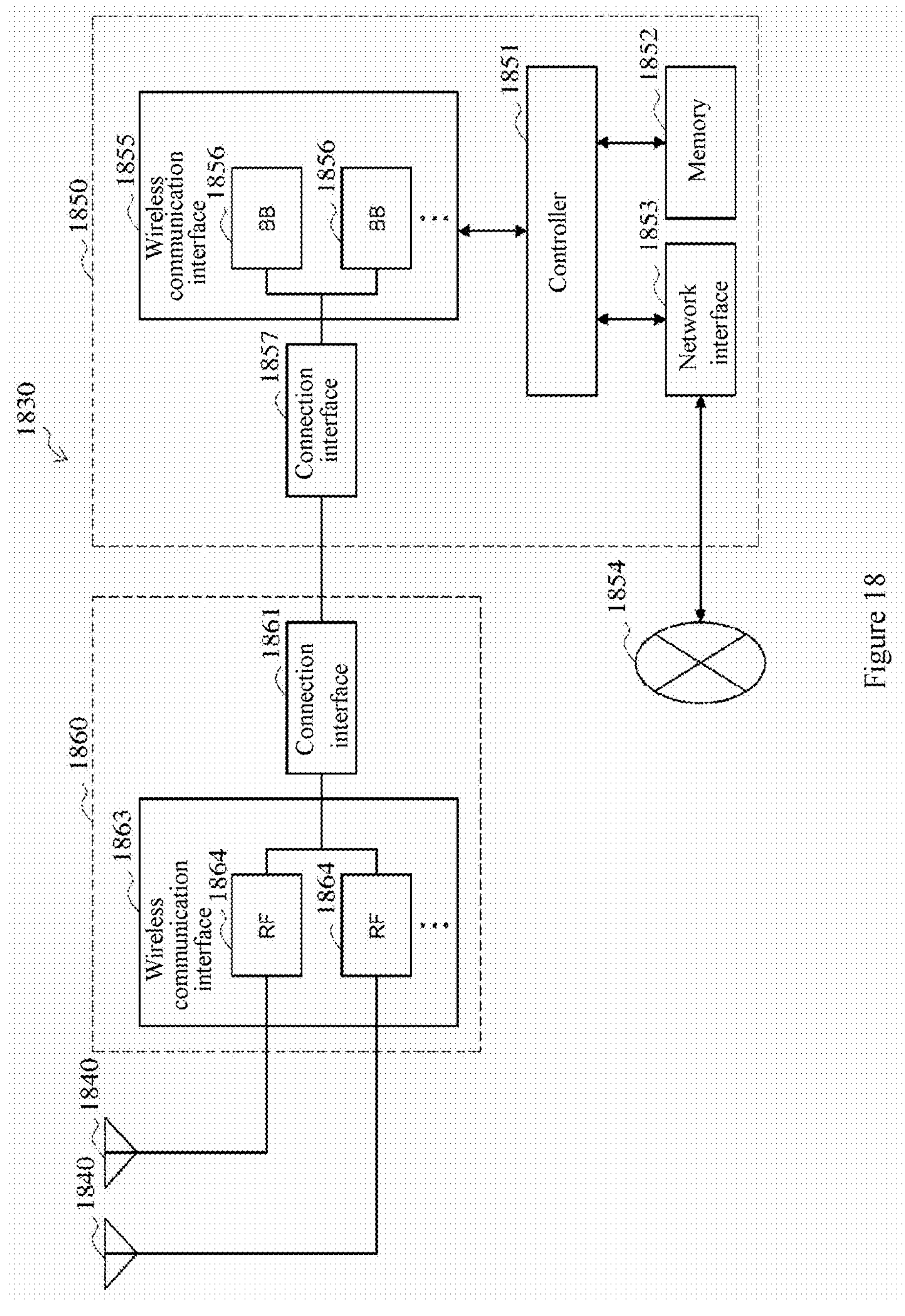
FIG. 18 is a block diagram showing a second example of a schematic configuration of an eNB.

FIG. 18 is a block diagram showing a second example of a schematic configuration of an eNB to which the technology of the present disclosure may be applied. An eNB 1830 includes a single or multiple antennas 1840, base station equipment 1850 and an RRH 1860. The RRH 1860 and the antennas 1840 may be connected to each other via an RF cable. The base station equipment 1850 and the RRH 1860 may be connected to each other via a high-speed line such as an optical fiber cable.

Each of the antennas 1840 includes a single or multiple antennal elements (such as multiple antenna elements included in a multiple-input multiple-output (MIMO) antenna), and is used for the RRH 1860 to transmit and receive wireless signals. As shown in FIG. 18, the eNB 1830 may include multiple antennas 1840. For example, the multiple antennas 1840 may be compatible with multiple frequency bands used by the eNB 1830. Although FIG. 18 shows an example in which the eNB 1830 includes multiple antennas 1840, the eNB 1830 may include a single antenna 1840.

The base station equipment 1850 includes a controller 1851, a memory 1852, a network interface 1853, a wireless communication interface 1855, and a connection interface 1857. The controller 1851, the memory 1852, and the network interface 1853 are the same as the controller 1721, the memory 1722, and the network interface 1723 described with reference to FIG. 17.

The wireless communication interface 1855 supports any cellular communication scheme (such as LTE and LTE-advanced), and provides wireless communication with a terminal located in a sector corresponding to the RRH 1860 via the RRH 1860 and the antenna 1840. The wireless communication interface 1855 may typically include, for example, a BB processor 1856. The BB processor 1856 is the same as the BB processor 1726 described with reference to FIG. 17, except that the BB processor 1856 is connected to an RF circuit 1864 of the RRH 1860 via the connection interface 1857. As show in FIG. 18, the wireless communication interface 1855 may include multiple BB processors 1856. For example, the multiple BB processors 1856 may be compatible with the multiple frequency bands used by the eNB 1830. Although FIG. 18 shows an example in which the wireless communication interface 1855 includes multiple BB processors 1856, the wireless communication interface 1855 may include a single BB processor 1856.

The connection interface 1857 is an interface for connecting the base station equipment 1850 (the wireless communication interface 1855) to the RRH 1860. The connection interface 1857 may be a communication module for communication in the above-described high speed line that connects the base station equipment 1850 (the wireless communication interface 1855) to the RRH 1860.

The RRH 1860 includes a connection interface 1861 and a wireless communication interface 1863.

The connection interface 1861 is an interface for connecting the RRH 1860 (the wireless communication interface 1863) to the base station equipment 1850. The connection interface 2461 may also be a communication module for communication in the above high-speed line.

The wireless communication interface 1863 transmits and receives wireless signals via the antenna 1840. The wireless communication interface 1863 may typically include, for example, the RF circuit 1864. The RF circuit 1864 may include, for example, a frequency mixer, a filter and an amplifier, and transmits and receives wireless signals via the antenna 1840. The wireless communication interface 1863 may include multiple RF circuits 1864, as shown in FIG. 18. For example, the multiple RF circuits 1864 may support multiple antenna elements. Although FIG. 18 shows the example in which the wireless communication interface 1863 includes multiple RF circuits 1864, the wireless communication interface 1863 may include a single RF circuit 1864.

In the eNB 1700 and eNB 1830 shown in FIG. 17 and FIG. 18, the determination unit 420, the allocation unit 430, and the generation unit 440 described with reference to FIG. 4 can be implemented by the controller 1721 and/or the controller 1851. At least a portion of the functionality may be implemented by the controller 1721 and the controller 1851. For example, the controller 1721 and/or the controller 1851 may perform functions determining characteristic information of a QoS flow of user equipment, allocating resources to the user equipment based on the characteristic information of the QoS flow, generating information representing a resource allocation result, and determining a DRX parameter, by executing corresponding instructions stored in the memory.

Application Examples of a Terminal Device

First Application Example

Figure 19:
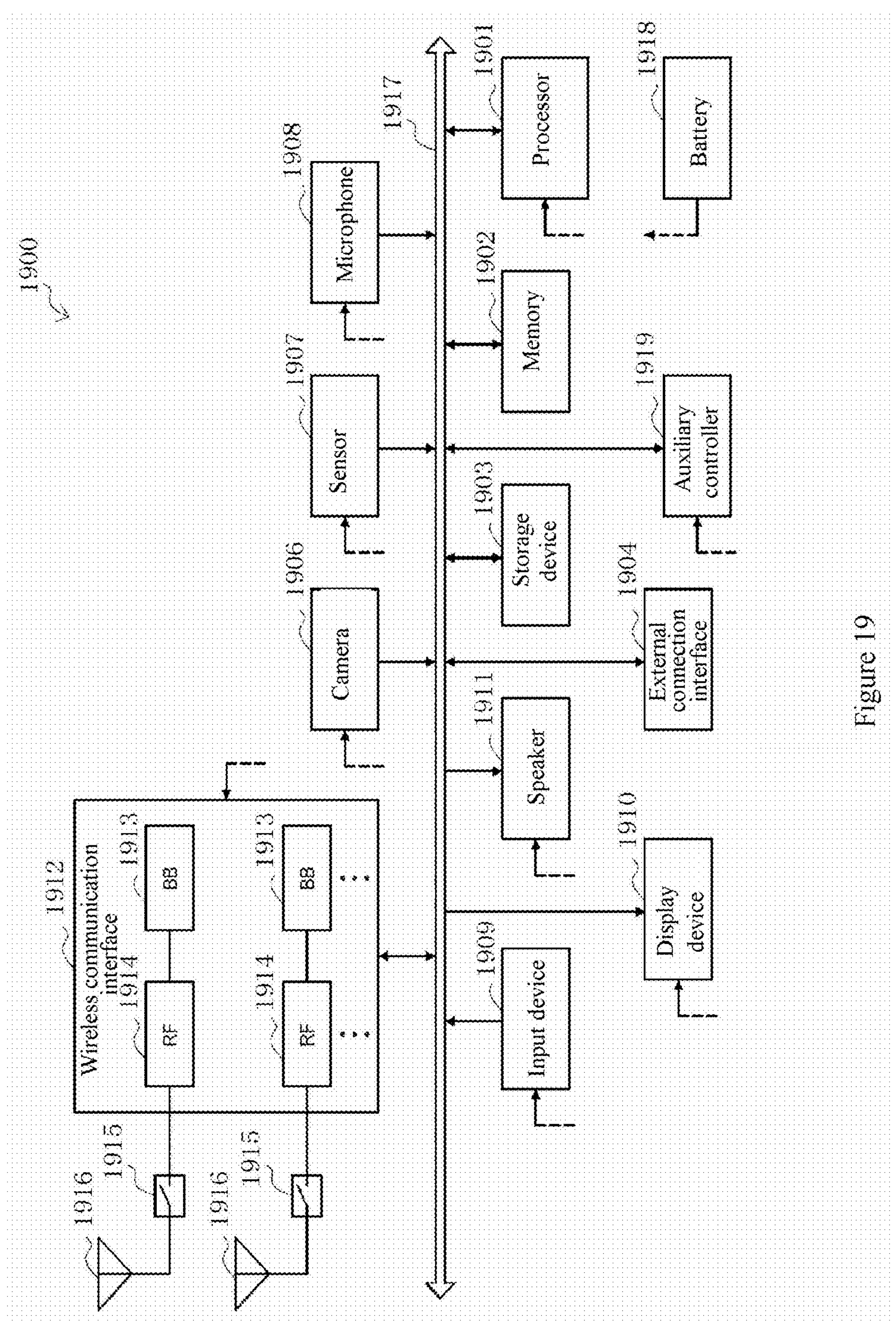
FIG. 19 is a block diagram showing an example of a schematic configuration of a smart phone.

FIG. 19 is a block diagram showing an example of a schematic configuration of a smartphone 1900 to which the technology according to the present disclosure may be applied. The smartphone 1900 includes a processor 1901, a memory 1902, a storage device 1903, an external connection interface 1904, a camera 1906, a sensor 1907, a microphone 1908, an input device 1909, a display device 1910, a speaker 1911, a wireless communication interface 1912, one or more antenna switches 1915, one or more antennas 1916, a bus 1917, a battery 1918, and an auxiliary controller 1919.

The processor 1901 may be, for example, a CPU or a system on a chip (SoC), and controls functions of an application layer and another layer of the smartphone 1900. The memory 1902 includes a RAM and a ROM, and stores a program executed by the processor 1901 and data. The storage 1903 may include a storage medium such as a semiconductor memory and a hard disk. The external connection interface 1904 is an interface for connecting an external device (such as a memory card and a universal serial bus (USB) device) to the smartphone 1900.

The camera 1906 includes an image sensor (such as a charge coupled device (CCD) and a complementary metal oxide semiconductor (CMOS)), and generates a captured image. The sensor 1907 may include a group of sensors, such as a measurement sensor, a gyro sensor, a geomagnetism sensor, and an acceleration sensor. The microphone 1908 converts sounds inputted to the smartphone 1900 to audio signals. The input device 1909 includes, for example, a touch sensor configured to detect touch onto a screen of the display device 1910, a keypad, a keyboard, a button, or a switch, and receives an operation or information inputted from a user. The display device 1910 includes a screen (such as a liquid crystal display (LCD) and an organic light-emitting diode (OLED) display), and displays an output image of the smartphone 1900. The speaker 1911 converts audio signals outputted from the smartphone 1900 to sounds.

The wireless communication interface 1912 supports any cellular communication scheme (such as LTE and LTE-advanced), and performs wireless communication. The wireless communication interface 1912 may include, for example, a BB processor 1913 and an RF circuit 1914. The BB processor 1913 may perform, for example, encoding/decoding, modulating/demodulating, and multiplexing/demultiplexing, and perform various types of signal processing for wireless communication. The RF circuit 1914 may include, for example, a mixer, a filter and an amplifier, and transmits and receives wireless signals via the antenna 1916. The wireless communication interface 1912 may be a chip module having the BB processor 1913 and the RF circuit 1914 integrated thereon. The wireless communication interface 1912 may include multiple BB processors 1913 and multiple RF circuits 1914, as shown in FIG. 19. Although FIG. 19 shows the example in which the wireless communication interface 1912 includes multiple BB processors 1913 and multiple RF circuits 1914, the wireless communication interface 1912 may include a single BB processor 1913 or a single RF circuit 1914.

Furthermore, in addition to a cellular communication scheme, the wireless communication interface 1912 may support another type of wireless communication scheme such as a short-distance wireless communication scheme, a near field communication scheme, and a wireless local area network (LAN) scheme. In this case, the wireless communication interface 1912 may include the BB processor 1913 and the RF circuit 1914 for each wireless communication scheme.

Each of the antenna switches 1915 switches connection destinations of the antennas 1916 among multiple circuits (such as circuits for different wireless communication schemes) included in the wireless communication interface 1912.

Each of the antennas 1916 includes a single or multiple antenna elements (such as multiple antenna elements included in an MIMO antenna) and is used for the wireless communication interface 1912 to transmit and receive wireless signals. The smartphone 1900 may include the multiple antennas 1916, as shown in FIG. 19. Although FIG. 19 shows the example in which the smartphone 1900 includes multiple antennas 1916, the smartphone 1900 may include a single antenna 1916.

Furthermore, the smartphone 1900 may include the antenna 1916 for each wireless communication scheme. In this case, the antenna switches 1915 may be omitted from the configuration of the smartphone 1900.

The bus 1917 connects the processor 1901, the memory 1902, the storage device 1903, the external connection interface 1904, the camera 1906, the sensor 1907, the microphone 1908, the input device 1909, the display device 1910, the speaker 1911, the wireless communication interface 1912, and the auxiliary controller 1919 to each other. The battery 1918 supplies power to blocks of the smartphone 1900 shown in FIG. 19 via feeder lines, which are partially shown as dashed lines in FIG. 19. The auxiliary controller 1919 operates a minimum necessary function of the smartphone 1900, for example, in a sleep mode.

In the smartphone 1900 shown in FIG. 19, the determination unit 210, the characteristic generation unit 220, and the request generation unit 240 described with reference to FIG. 2 may be implemented by the processor 1901 or the auxiliary controller 1919. At least a part of the functions may be implemented by the processor 1901 or the auxiliary controller 1919. For example, the processor 1901 or the auxiliary controller 1919 may perform the functions of determining characteristic information of a QoS flow, generating the characteristic information of the QoS flow, generating request information for allocating resources throughout a time domain, and determining a DRX parameter by executing instructions stored on the memory 1902 or the storage device 1903.

Second Application Example

Figure 20:
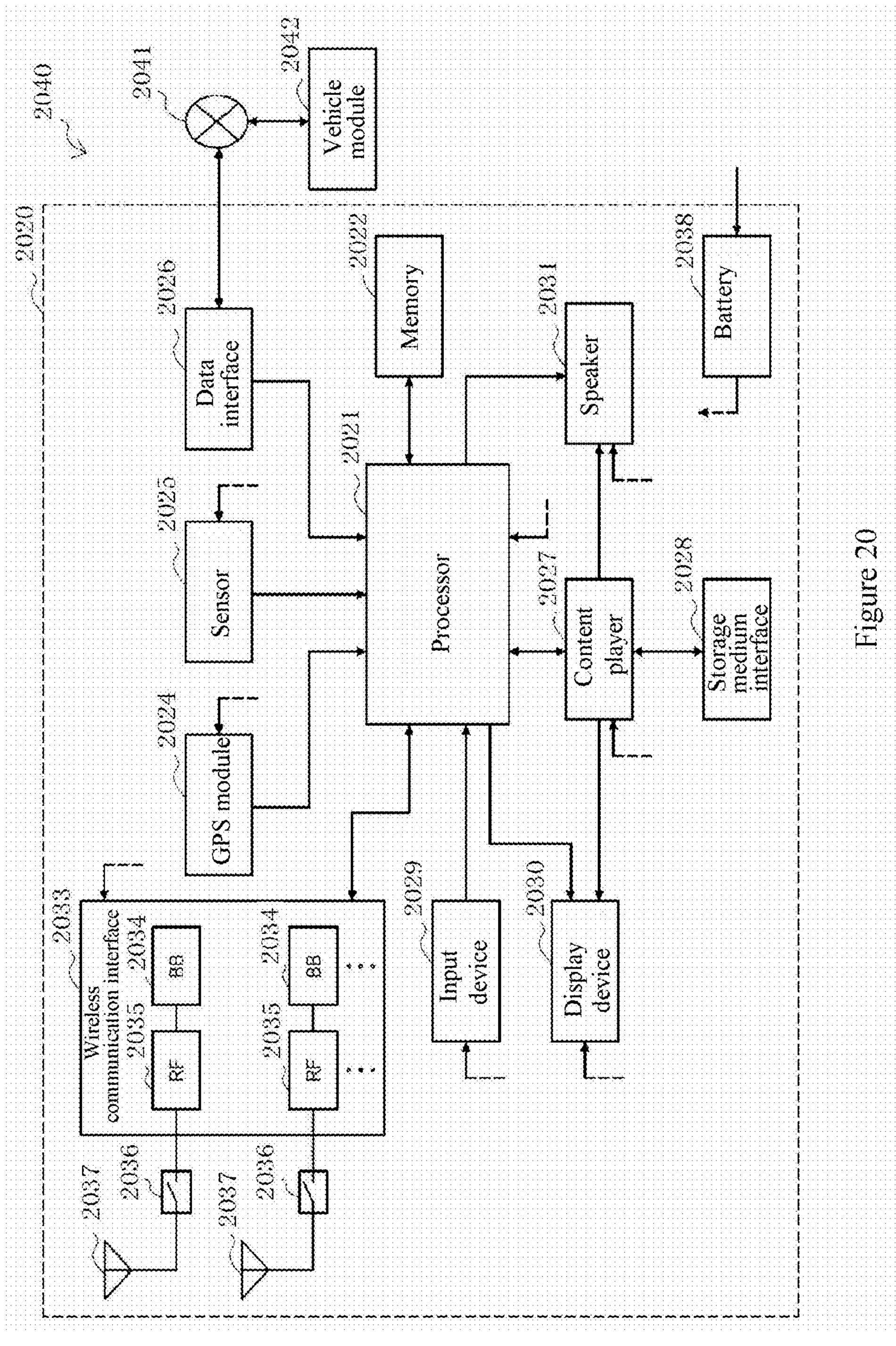
FIG. 20 is a block diagram showing an example of a schematic configuration of a car navigation device.

FIG. 20 is a block diagram showing an example of a schematic configuration of a navigation apparatus 2020 to which the technology according to the present disclosure may be applied. The navigation apparatus 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a wireless communication interface 2033, one or more antenna switches 2036, one or more antennas 2037, and a battery 2038.

The processor 2021 may be, for example a CPU or a SoC, and controls a navigation function and additional function of the navigation apparatus 2020. The memory 2022 includes RAM and ROM, and stores a program executed by the processor 2021, and data.

The GPS module 2024 measures a position (such as latitude, longitude and altitude) of the navigation apparatus 2020 by using GPS signals received from a GPS satellite. The sensor 2025 may include a group of sensors such as a gyro sensor, a geomagnetic sensor and an air pressure sensor. The data interface 2026 is connected to, for example, an in-vehicle network 2041 via a terminal that is not shown, and acquires data (such as vehicle speed data) generated by the vehicle.

The content player 2027 reproduces content stored in a storage medium (such as a CD and DVD) that is inserted into the storage medium interface 2028. The input device 2029 includes, for example, a touch sensor configured to detect touch on a screen of the display device 2030, a button, or a switch, and receives an operation or information inputted from a user. The display device 2030 includes a screen such as an LCD or OLED display, and displays an image of the navigation function or reproduced content. The speaker 2031 outputs a sound for the navigation function or the reproduced content.

The wireless communication interface 2033 supports any cellular communication scheme (such as LTE and LTE-Advanced), and performs wireless communication. The wireless communication interface 2033 may typically include, for example, a BB processor 2034 and an RF circuit 2035. The BB processor 2034 may perform, for example, encoding/decoding, modulating/demodulating and multiplexing/demultiplexing, and perform various types of signal processing for wireless communication. The RF circuit 2035 may include, for example, a mixer, a filter and an amplifier, and transmits and receives wireless signals via the antenna 2037. The wireless communication interface 2033 may also be a chip module having the BB processor 2034 and the RF circuit 2035 integrated thereon. As shown in FIG. 20, the wireless communication interface 2033 may include multiple BB processors 2034 and multiple RF circuits 2035. Although FIG. 20 shows the example in which the wireless communication interface 2033 includes multiple BB processors 2034 and multiple RF circuits 2035, the wireless communication interface 2033 may include a single BB processor 2034 and a single RF circuit 2035.

Furthermore, in addition to a cellular communication scheme, the wireless communication interface 2033 may support another type of wireless communication scheme such as a short-distance wireless communication scheme, a near field communication scheme, and a wireless LAN scheme. In this case, the wireless communication interface 2033 may include the BB processor 2034 and the RF circuit 2035 for each wireless communication scheme.

Each of the antenna switches 2036 switches connection destinations of the antennas 2037 among multiple circuits (such as circuits for different wireless communication schemes) included in the wireless communication interface 2033.

Each of the antennas 2037 includes a single or multiple antenna elements (such as multiple antenna elements included in an MIMO antenna), and is used for the wireless communication interface 2033 to transmit and receive wireless signals. As shown in FIG. 20, the car navigation apparatus 2020 may include multiple antennas 2037. Although FIG. 20 shows the example in which the car navigation apparatus 2020 includes multiple antennas 2037, the car navigation apparatus 2020 may include a single antenna 2037.

Furthermore, the car navigation apparatus 2020 may include the antenna 2037 for each wireless communication scheme. In this case, the antenna switches 2036 may be omitted from the configuration of the navigation apparatus 2020.

The battery 2038 supplies power to the blocks of the car navigation apparatus 2020 shown in FIG. 20 via feeder lines that are partially shown as dash lines in FIG. 20. The battery 2038 accumulates power supplied from the vehicle.

In the car navigation apparatus 2020 shown in FIG. 20, the determination unit 210, the characteristic generation unit 220, and the request generating unit 240 described with reference to FIG. 2 may be implemented by the processor 2021. At least a part of the functions may be implemented by the processor 2021. For example, the processor 2021 may perform the functions of determining characteristic information of a QoS flow, generating the characteristic information of the QoS flow, generating request information for allocating resources throughout a time domain, and determining a DRX parameter by executing instructions stored on the memory 2022.

The technical solution of the present disclosure may be implemented as an in-vehicle system (or vehicle) 2040 including the car navigation apparatus 2020, the in-vehicle network 2041, and one or more blocks of a vehicle module 2042. The vehicle module 2042 generates vehicle data such as vehicle speed, engine speed, and fault information, and outputs the generated data to the in-vehicle network 2041.

The preferred embodiments of the present disclosure are described above with reference to the drawings, but the present disclosure is not limited to the above examples. Various alternations and modifications may be obtained by those skilled in the art within the scope of the claims, and it should be understood that these alternations and modifications shall naturally fall within the technical scope of the present disclosure.

For example, a unit shown by a dashed box in the functional block diagram shown in the drawings indicates that the functional unit is optional in the corresponding device, and the optional functional units may be combined in an appropriate manner to achieve a expected function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Apparently, such configurations are within the technical scope of the present disclosure.

In this specification, the steps described in the flowchart include not only processes performed in time series as the order described, but also processes performed in parallel or individually instead of having to be performed in time series. Further, even in the steps processed in time series, the order can be appropriately changed.

Although the embodiments of the present disclosure have been described above in detail in connection with the drawings, it is appreciated that the embodiments described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and equivalents thereof.

The invention claimed is:

1. User equipment, comprising processing circuitry configured to:

generate characteristic information of a QoS flow used for D2D communication between the user equipment and other user equipment, the characteristic information including periodicity information and transmission time information of a data service carried by the QoS flow, and transmit the characteristic information to network side equipment, for the network side equipment to allocate resources used for the D2D communication for the user equipment according to the characteristic information, wherein the processing circuitry is further configured to:

determine the characteristic information at an application layer of the user equipment and transfer the characteristic information to a NAS layer of the user equipment, or generate, at the application layer of the user equipment, indication information indicating that transmission of the data service has periodicity; and determine, at the NAS layer of the user equipment, the characteristic information of the QoS flow according to historical data of the data service on the QoS flow, or carry the characteristic information through RRC signaling.

2. The user equipment according to claim 1, wherein the periodicity information includes a transmission period of the data service or a transmission frequency of the data service, and the transmission time information includes a transmission start time of data of the data service in any data transmission period.

3. The user equipment according to claim 2, wherein the characteristic information further includes: data size information of the data service in one data transmission period; and/or information representing whether the user equipment supports an adjustment for the transmission time information.

4. The user equipment according to claim 2, wherein the processing circuitry is further configured to: determine, based on the characteristic information of the QoS flow, a parameter of the user equipment in a discontinuous reception, DRX, mode, wherein the user equipment enters an activated state and a sleep state periodically when in the DRX mode.

5. The user equipment according to claim 4, wherein the parameter of the user equipment in the DRX mode includes a DRX period, and wherein the processing circuitry is further configured to: determine the DRX period based on the transmission period of the data service, so that the transmission period of the data service is a positive integer multiple of the DRX period; and transmit the DRX period to the network side equipment.

6. The user equipment according to claim 5, wherein the parameter of the user equipment in the DRX mode includes a start time and an end time of an activated state, and the processing circuitry is further configured to: determine the start time and the end time of the activated state based on the transmission start time of data of the data service in any data transmission period, so that the transmission start time of data of the data service in any data transmission period is not earlier than the start time of the activated state and not later than the end time of the activated state; and transmit the start time and the end time of the activated state to the network side equipment.

7. The user equipment according to claim 1, wherein the processing circuitry is further configured to:

generate updated characteristic information of the QoS flow, in a case that a fixed change occurs in the characteristic information of the QoS flow, and transmit the updated characteristic information of the QoS flow to the network side equipment, or generate request information for requesting the network side equipment to allocate resources to the user equipment throughout a time domain, in a case that a non-fixed change occurs in the characteristic information of the QoS flow, wherein the request information includes a minimum transmission period or maximum transmission frequency of data carried by the QoS flow, and transmit the request information to the network side equipment.

8. A wireless communication method executed by user equipment, comprising:

generating characteristic information of a QoS flow used for D2D communication between the user equipment and other user equipment, the characteristic information including periodicity information and transmission time information of a data service carried by the QoS flow; and transmitting the characteristic information to network side equipment, for the network side equipment to allocate resources used for the D2D communication for the user equipment according to the characteristic information;

generating updated characteristic information of the QoS flow, in a case that a fixed change occurs in the characteristic information of the QoS flow, and transmit the updated characteristic information of the QoS flow to the network side equipment, or generating request information for requesting the network side equipment to allocate resources to the user equipment throughout a time domain, in a case that a non-fixed change occurs in the characteristic information of the QoS flow wherein the request information includes a minimum transmission period or maximum transmission frequency of data carried by the QoS flow, and transmitting the request information to the network side equipment.

9. User equipment, comprising processing circuitry configured to:

generate characteristic information of a QoS flow used for D2D communication between the user equipment and other user equipment, the characteristic information including periodicity information and transmission time information of a data service carried by the QoS flow;

transmit the characteristic information to network side equipment, for the network side equipment to allocate resources used for the D2D communication for the user equipment according to the characteristic information;

determine, based on the characteristic information of the QoS flow, a parameter of the user equipment in a discontinuous reception, DRX, mode, wherein the user equipment enters an activated state and a sleep state periodically when in the DRX mode;

determine a DRX period based on the transmission period of the data service, so that the transmission period of the data service is a positive integer multiple of the DRX period; and transmit the DRX period to the network side equipment, wherein the periodicity information includes a transmission period of the data service or a transmission frequency of the data service, and the transmission time information includes a transmission start time of data of the data service in any data transmission period, and wherein the parameter of the user equipment in the DRX mode includes the DRX period.

* * * * *